(12) United States Patent
Allen

(10) Patent No.: US 10,320,698 B1
(45) Date of Patent: Jun. 11, 2019

(54) DETERMINING NETWORK CONNECTIVITY FOR PLACEMENT DECISIONS

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 14/180,275

(22) Filed: Feb. 13, 2014

(51) Int. Cl.
| | |
|---|---|
| *H04L 12/911* | (2013.01) |
| *H04L 12/751* | (2013.01) |
| *H04L 12/753* | (2013.01) |
| *H04L 12/24* | (2006.01) |
| *H04L 29/08* | (2006.01) |

(52) U.S. Cl.
CPC .............. *H04L 47/70* (2013.01); *H04L 41/12* (2013.01); *H04L 45/02* (2013.01); *H04L 45/48* (2013.01); *H04L 67/101* (2013.01); *H04L 67/1023* (2013.01)

(58) Field of Classification Search
CPC ......... H04L 45/02; H04L 45/48; H04L 41/12; H04L 67/101; H04L 67/1023
USPC ................ 709/220, 221, 222, 223, 224, 226
See application file for complete search history.

(56) References Cited

U.S. PATENT DOCUMENTS

| 6,816,585 | B1 | 11/2004 | Blatt et al. | |
|---|---|---|---|---|
| 7,652,998 | B2 * | 1/2010 | Yasukawa | H04L 12/1877 370/238 |
| 8,107,399 | B2 * | 1/2012 | Bejerano | H04L 45/02 370/216 |
| 2004/0034795 | A1 * | 2/2004 | Anderson | G06F 11/328 709/213 |
| 2004/0218536 | A1 * | 11/2004 | Yasukawa | H04L 12/1877 370/238 |
| 2004/0248576 | A1 | 12/2004 | Ghiglino et al. | |
| 2004/0249939 | A1 * | 12/2004 | Amini | H04L 29/06 709/225 |
| 2005/0039123 | A1 * | 2/2005 | Kuchinsky | G06F 19/26 715/205 |
| 2005/0053009 | A1 * | 3/2005 | Denby | H04L 41/0631 370/250 |
| 2008/0304422 | A1 * | 12/2008 | Bejerano | H04L 45/02 370/252 |
| 2011/0173327 | A1 * | 7/2011 | Chen | G06F 9/5066 709/226 |
| 2012/0005342 | A1 * | 1/2012 | Deng | G06F 9/5044 709/225 |
| 2012/0297038 | A1 * | 11/2012 | Mei | G06Q 50/01 709/223 |
| 2013/0212578 | A1 | 8/2013 | Garg et al. | |
| 2014/0369229 | A1 | 12/2014 | Martineau | |

* cited by examiner

*Primary Examiner* — Edward Kim

(74) *Attorney, Agent, or Firm* — Davis Wright Tremaine LLP

(57) ABSTRACT

Techniques for making placement decisions for the placement of computing resources in a computer network utilize approximations of the network. A simplified representation of the network is used to determine a placement that satisfies a set of connectivity requirements. The simplified representation may be generated, at least in part, probabilistically based on the network.

25 Claims, 16 Drawing Sheets

DETERMINING NETWORK CONNECTIVITY FOR PLACEMENT DECISIONS

CROSS-REFERENCE TO RELATED APPLICATIONS

This application incorporates by reference for all purposes the full disclosure of co-pending U.S. patent application Ser. No. 14/180,301, filed concurrently herewith, entitled "ITERATIVE NETWORK GRAPH PLACEMENT."

BACKGROUND

Modern distributed computer systems are frequently implemented with a plurality of guest virtual computing systems that operate on one or more host computer environments. Such computer systems often create, destroy, suspend and resume guest virtual machines on a regular basis. At the same time, the distributed systems in which the guest virtual machines are implemented are often highly complex, comprising large numbers of networked host machines. Inefficient placement algorithms may consume significant time in placing the guest virtual machines as they are instantiated, particularly when there are a large number of host systems or when those host systems are overly crowded. Frequently such placement algorithms do not scale well, becoming increasingly slow when the numbers of guest virtual machines and host computer environments grow. As the size and complexity of distributed and/or virtualized computing systems increase, inefficient placement and instantiation of guest virtual computing systems on host computer environments may lead to system slowdowns and/or outages and may adversely affect system availability and performance.

BRIEF DESCRIPTION OF THE DRAWINGS

Various embodiments in accordance with the present disclosure will be described with reference to the drawings, in which.

DETAILED DESCRIPTION

Figure 1:
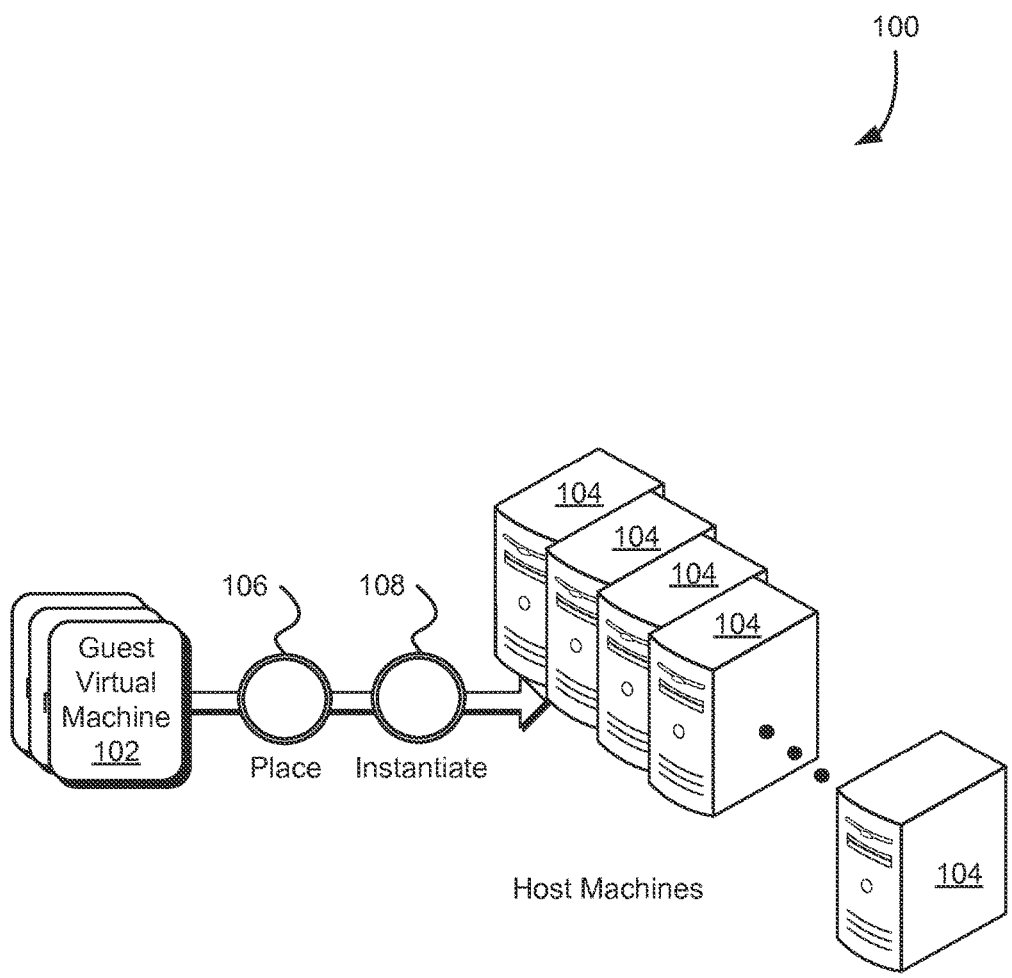
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for making decisions on the placement of resources in a distributed system. Generally, a distributed system may have complex requirements for placing components amongst machines based on network connectivity between portions of the system. The distributed system may, for example, comprise a plurality of computing devices hosted by a computing resource service provider that support virtual machine instances on behalf of customers. The requirements may be those of a customer of the computing resource service provider, requirements of the service provider (e.g., to ensure a positive customer experience) or otherwise. It should be noted that, while a computing resource provider that hosts computing devices to implement virtual machine instances on behalf of customers is used throughout for the purpose of illustration, the techniques described herein and variations thereof are applicable to other contexts, such as general contexts when decisions on where to place computing resources among components of a distributed system (i.e., a system comprising multiple computing devices that communicate in a network) are made.

Traditional methods for making placement decisions may model network connectivity using graph-based methods, where the term graph is used in the mathematical sense, comprising a collection of vertices and edges connecting the vertices. These methods may utilize calculations of connectivity based on the lengths of paths within the graph or based on the number of independent paths within the graph. However, calculating connectivity based on a metric blended between the two may be overly computationally expensive to use in placement decisions. For example, some distributed systems comprise thousands of separate computing devices and, as a result, working with graph-based models of such systems can be extremely computationally expensive. With such techniques, some graph instances may permit easy computation of a blended metric and some other graph instances may require a significant, often prohibitive, amount of time to evaluate.

Various techniques described and suggested herein provide efficient implementations for calculation of a blended connectivity metric. The use of an efficient implementation allows a blended metric to be used in making placement decisions efficiently and effectively, thereby providing a positive customer/user experience. In an embodiment, a placer (e.g., computer system implementing a placer process), constructs a network graph for a plurality of machines (computing devices) such that each edge between two nodes in the network graph is weighted according to connectivity between a corresponding pair of machines. Connectivity may be measured in various ways, such as bandwidth achievable between the machines. The network graph may be constructed by, for instance, encoding information about the network in an appropriate data structure. In some examples, the network graph is represented by a matrix modeling the network graph, such as the Laplacian of the network graph. The placer may receive a component graph (also referred to as a user graph) for components in a distributed system such that each edge between two nodes in the component graph is weighted according to connectivity requirements between a corresponding pair of components. The placer may similarly represent the component graph as a data structure encoding a matrix that represents the component graph.

To determine a set of components of the network for placement, the placer may select a subgraph of a spanning tree of the network graph, where the subgraph may be the spanning tree unless specified as a proper subgraph. The spanning tree may be identified using various techniques. For example, in some embodiments, critical edges of the graph corresponding to network chokepoints (e.g., portions of the network with lower redundancy) may be identified for exclusion from an edge deletion process. Edges of the network graph may be deleted to simplify the graph. For example, a probabilistic procedure for selecting edges for deletion may be used where performance of the process spares critical edges from deletion. Any of a number of suitable algorithms for selection of a spanning tree may be used to select a spanning tree of the network graph. It should be noted that the deletion process may result in a proper subgraph of a spanning tree, such as if a deletion results in two disconnected subgraphs of the network graph and such a subgraph of the spanning tree may nevertheless be used in accordance with various embodiments.

Once a subgraph of the spanning tree is selected, the placer may determine a number of edges to add to the subgraph based on a deadline for completing a placement decision, where the deadline may be a preprogrammed deadline or may be a dynamic deadline that may change based at least in part on current load on the placer (e.g., a number of placement decisions in a queue of placement requests). The placer may add the determined number of edges to the subgraph of the spanning tree of the network graph such that the probability of selecting an edge to add is based at least in part on the edge weight in the network graph. The probability may be assigned, for example, such that higher weights correlate with higher probabilities of selection.

In an embodiment, the placer approximates a connectivity metric by solving a linear system of equations based at least in part on a Laplacian for the network graph. The Laplacian for the network graph may be preconditioned based at least in part on the subgraph. The manner in which the subgraph is constructed may be configured such that preconditioning of the Laplacian of the network graph results in a system of equations that is, on average, computationally more efficient to solve and that has mathematical properties resulting in a lower likelihood that iterative techniques for obtaining a solution will be less efficient than other techniques, such as Gaussian elimination. The placer may assign at least a portion of components in the component graph to machines in the network graph based on a fit between the connectivity metric and the component graph. After receiving a notification that the assigned portion of components is successfully initialized, the placer may iteratively perform placements until each of the received components are assigned.

In some embodiments, the component graph received by the placer may be a reduced representation of a set of components that may be requested to be placed in a distributed computer system wherein nodes representing components and/or edges representing connections between components may have been removed in order to simplify the graph and/or the resulting placement decisions. A graph may be received by (also referred to herein as "obtaining a graph" or "receiving a graph") a placer and/or one or more other services, processes or applications associated with and/or under control of the placer. Obtaining a graph or receiving a graph refers to the process of obtaining or receiving an electronic representation of a graph which includes information indicating one or more vertices (also referred to herein as "nodes") of the graph and information indicating how one or more edges connect the one or more vertices. The obtained or received electronic representation of the graph may include additional information including, but not limited to, information about the type of data represented by the vertices of the graph, information about weights of the edges wherein the weights may represent one or more quantities and/or constraints on how the edges connect the one of more vertices and/or other such information. Each node in the component graph may be a request to place a single component or may be a request to place a plurality of components such that each of the plurality of components is placed at the same destination.

As mentioned previously, a large and/or complex component graph within a large and/or complex network graph may be very computationally expensive. The placer may first simplify the placement problem by reducing the set of candidate placement locations in the network graph by reducing the network graph. The placer may reduce the set of candidate nodes in the network graph by selecting a subset of nodes from the set of nodes which are important within the computer system and/or by selecting a subset of the edges connecting those nodes. A subset of nodes which are important within the computer system may be selected from the set of nodes based a number of factors including, but not limited to, resource availability, proximity to other nodes, location within the network, proximity to computer system resources and/or other such factors. The set of nodes that are important within the computer system network may be referred to herein as "important nodes" or "interesting nodes" or "suitable nodes" or simply as a "reduced subset of candidate placement nodes." In some embodiments, the placer may determine a subset of important nodes by, for example, solving a matrix equation such as the matrix equation using the Laplacian of the network graph and a weighted vector based on the resources required by each node, to produce a solution indicating those nodes that are connected to nodes with high resources.

Once a subgraph representing a reduced subset of candidate placement nodes is determined, the component graph nodes may be placed within the subgraph of the reduced subset of candidate placement nodes in order to determine possible placements for the candidate components in the network. The placer may select one or more candidate components, either at random or according to some selection criteria and may then begin the placement process by pinning the selected candidate component or components to a randomly selected candidate placement location node that may be one of the reduced subset of candidate placement nodes. Pinning is a technique that may help constrain a solution set by establishing one or more conditions (in this example, fixing the location of one of the candidate components). After pinning one or more candidate components, the placer may select one or more candidate components which are neighbors of at least one of the one or more pinned components and may then place those neighbor candidate components in a placement location node that may be selected according to one or more constraints and/or weights on the connection between the one or more neighbor and the pinned components. The placer may iteratively select neighbor candidate components until all components in the component graph have been placed in the network graph.

In some embodiments, the placement determined by not be efficient, may not be legal because it violates one or more weights and/or constraints on component connections or may result in placements with unbalanced resource allocations. As mentioned herein, a number of factors may be used to determine the suitability of a particular solution that may result from such a placement approach. Such factors include, but may not be limited to, satisfying of placement weights and/or constraints, balancing of resources, bandwidth of connections, latency of connections, placement complexity, business value of the placement, economic value of the placement and/or other such factors. In some embodiments, a placement may have one or more suitability scores based at least in part on these factors. When a placement results in a poor suitability score the placer may seek a different placement by, for example, adjusting the weights and/or constraints associated with one or more of the candidate component connections and running the placement again. In some embodiments, the placer may alter the weights and/or one or more constraints by applying random value perturbations to the weights and/or constraints. For example, the placer may randomly add and/or subtract values to one or more weights or may tighten and/or relax one or more constraints. Such alterations to the weights and/or constraints produce an altered set of conditions which may result in a different placement solution when the placement is run again. The different placement solution may result in a better or worse suitability score and thus, solutions that result in better suitability scores may be retained while those that do not may be discarded. Iteratively perturbing weights and/or constraints on placement of the components with random value changes, re-running the placement and selecting those perturbations that improve the placement solution may result in a solution that converges to an optimal and/or near optimal placement solution using a global optimization approach such as, for example, a metaheuristic such as simulated annealing, a heuristic such as a genetic algorithm and/or some other such approach.

The placement approach described above herein, wherein each component is individually placed within the network graph according its own best-fit conditions, may produce locally efficient placements that may not be globally efficient. For example, in such a placement approach, components that are placed later in the iterative process may have few and/or no efficient locations available for placement. In such an example, the placer, rather than selecting components individually, may select multiple neighbor components for placement. For example, the placer may select all neighbors of a pinned component and attempt to place at least a subset of the set of all neighbors of a pinned component at the same time. Such an approach may produce a more globally efficient solution although such an approach may also be more computationally expensive than the individual node approach. The placer may also mix and match between individual and collective placement approaches, either within the same optimization iteration or from iteration to iteration. As may be contemplated, the approaches to making individual and/or collective placement decisions described herein are illustrative examples and other such approaches may be considered within the scope of the present disclosure.

When the size of a graph increases, a number of different approaches can be made to improve the efficiency of the placement algorithm and/or the efficiency of the solution optimization. As mentioned previously herein, pinning components to certain network locations may help constrain the solution and improve the efficiency of the placement algorithm and/or of the solution optimization. In some embodiments, the placer may pin only a single node and in some other embodiments, the placer may pin multiple nodes. In order to preclude the problem of over-constraining the system of equations and thus, possibly precluding any efficient solution, a placer may pin only a certain subset of components based on, for example, a proportion of the constraints such as 1% rounded up. The presence of multiple pinned components may alter the placement approach based on the plurality of pinned components. For example, the placer may choose a pinned component and place all of its neighbors and then choose a next pinned component and place all of its neighbors, until all components are placed. In another example, the placer may choose a pinned component and place only one of its neighbors, and then choose a next pinned component and place only one of its neighbors, until all components are placed. The first approach may produce a very efficient local solution, particularly for the earlier chosen pinned components while the second approach may produce a better global solution. As mentioned previously herein, the placer may use one or the other approach and/or may use multiple approaches in a single optimization iteration or between optimization iterations and as may be contemplated, the approaches to choosing neighbors with respect to the pinned components are described herein are illustrative examples and other such approaches may be considered within the scope of the present disclosure.

Other approaches to improving either an individual solution and/or to improving convergence to an optimal solution may be used by the placer. For example, the placer may be configured to detect that a particular iteration is leading to an increasingly poor solution by, for example, aggregating suitability scores during placement. In such an example, the placer may, upon detecting an approaching bad solution, reverse (or roll back) one or more of the placement steps and/or alter the weights and/or constraints for the reversed placements in order to alter the trend toward an inefficient solution. The placer may also divide a large placement problem into smaller, and presumably more manageable, sub-problems by subdividing the component graph into smaller subgraphs. The smaller subgraphs may be created by, for example, removing high-bandwidth, bottleneck and/or otherwise critical connection edges, or may be created by cutting so that the subgraphs are balanced or may be created by some other such graph subdivision technique. The placer may then solve each individual sub-problem before recombining the problems by restoring one or more removed connections. It must be noted that such subdivision approaches may introduce additional factors in scoring the suitability of a particular solution such as sub-solutions that collide (thus producing one or more illegal placements), the cost of subdivision, the cost of restoring edges (possibly requiring instantiation of new connections), the complexity of the subdivision, the speed of the solution and/or other such factors.

FIG. 1 illustrates an environment 100 for placing guest virtual machines on distributed, virtualized and/or datacenter computer system environments, as well as the associated code running thereon in accordance with at least one embodiment. A set of guest virtual machines 102 are to be placed among a collection of host machines 104. Each guest virtual machine 102 may be one of a plurality of guest virtual machines ready for instantiation on a host machine 104 as a result of requests from customers of a service provider hosting the host machines 104, or from other computer systems, or a result of automated processes running on this or other computer systems or for other such reasons.

In some embodiments the host machines 104 in the environment 100 may comprise controlling domains, such as hypervisors, that manage and control the guest virtual machines operating on that host machine and the host machines. In some embodiments, prior to being placed, a computer system (which may be referred to as a placer and, as with other computer systems described herein, may be a distributed computer system) may determine which host machine of the one or more host machines to place the guest virtual machine on under the control of one or more processes operating on the computer system. A placer may be implemented by one or more of the host machines 104 in the environment 100. As such, one or more of the host machines may also, in some embodiments, have one or more placer processes that control the placement of guest virtual machines among the host machines 104 in the environment 100. A placer process or processes may be separate from a controlling domain or may be connected to the controlling domain. In some embodiments, the placer process or processes may run on a proper subset of the host machines 104. In some embodiments, placer processes and controlling domains work together in a cooperative manner to manage and control the placement and operation of guest virtual machines using techniques described herein.

As illustrated in FIG. 1, various operations may be performed in order to provide operating computer systems for customers and/or for other computer system entities. Such operations may include placement 106 of the guest virtual machines 102 among the host machines 104 and instantiation 108 of the placed guest virtual machines 102. Placement, in an embodiment, is a selection of a set of host machines 104 (e.g., a proper subset of available host machines) for instantiation of a set of guest virtual machines. Instantiation of the guest virtual machines 102, in an embodiment, is the performance of operations that results in the guest virtual machines 102 being used as the basis for operations in a corresponding host machine 104. i.e., so that the host machines 104 operate in accordance with a corresponding loaded guest virtual machine 102. The operations of instantiation of a guest virtual machine may include, for example, transferring some or all of the data of a guest virtual machine 102 (also referred to as an image) to the host machine and performing a boot or resume process so that the host machine 104 operates in accordance with executable instructions and other data of the guest virtual machine.

Figure 2:
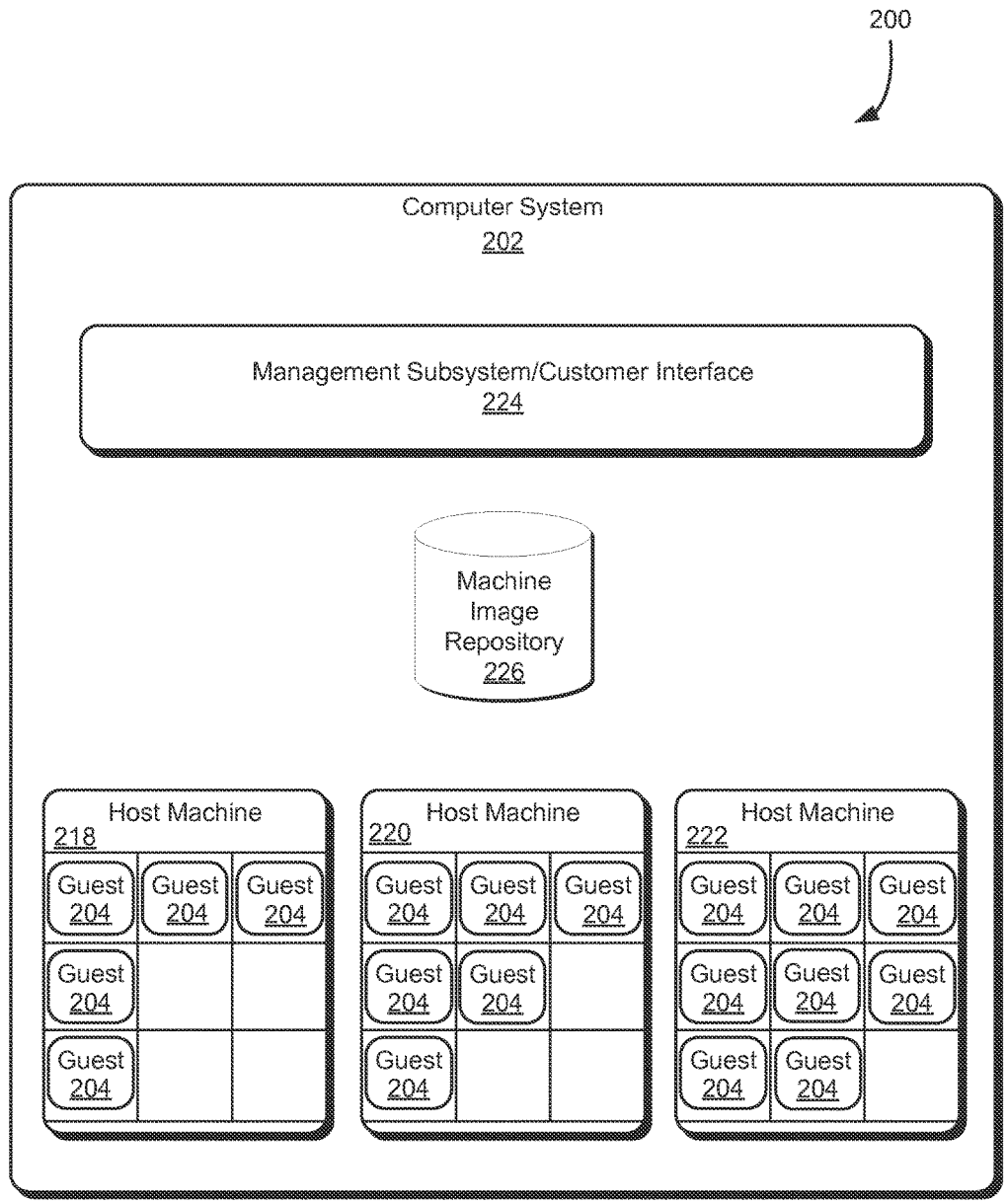
FIG. 2 shows an illustrative example of an environment that may be used to implement various aspects of the present disclosure.

FIG. 2 illustrates an example environment 200 where one or more sets of guest virtual machines may be placed and instantiated on one or more host machines on a distributed, virtualized and/or datacenter computing environment as described at least in connection with FIG. 1 and in accordance with at least one embodiment. A computer system may contain one or more host machines as described herein at least in connection with FIG. 1 and in accordance with at least one embodiment. Each of the host computer systems may have one or more guests or guest virtual machines running thereon or may, in some embodiments, have no guests or guest virtual machines running thereon. The guests on each of the host machines may have been previously placed and instantiated by a placer process as described herein and at least in connection with FIG. 1 and in accordance with at least one embodiment.

The environment illustrated in FIG. 2 includes host machines 218, 220 and 222, which may be three of a plurality of a distributed computer system 202. Each host machine may contain one or more previously placed and instantiated 204 guest virtual machines, as described herein at least in connection with FIG. 1 and in accordance with at least one embodiment. In various embodiments, a host machine might not contain any previously placed and instantiated guest virtual machines as described herein at least in connection with FIG. 1 and in accordance with at least one embodiment.

Host machines may have varying amounts of available capacity that is usable to instantiate additional guest virtual machines. The host machine 218, in this example, has capacity for four guest virtual machines (as represented in the figure as four empty boxes) before placement of any additional guest virtual machines on the host machine 218 is prohibited, such as to ensure that the provisioned guest virtual machines have enough capacity of the computing resources (processors, memory, bandwidth, etc.) of the host machine 218 to avoid competition for resources causing undue performance degradations. Similarly, the host machine 220, in this example, has capacity for three guest virtual machines before additional placement on the host machine 220 is prohibited. Finally, the host machine 222, in this example, has additional capacity for allocation to one additional guest virtual machine before additional placement on the host machine 222 is prevented.

Generally, each host machine may comprise one or more slots (represented by the boxes in the figure) for the allocation of a virtual machine instance. Each slot may represent an allocation of a set of resources from the host machine for performing one or more operations in support of a virtual machine instance. For instance, a slot may represent a defined portion of the processing capabilities of a host machine. When a customer or other user requests creation of a virtual machine instance (e.g., through an API call to the distributed computer system 202), the customer or other user may be able to specify how large the virtual machine instance should be, where size corresponds to a resource allocation. Accordingly, the larger a virtual machine instance is, the more slots the instance may consume in a host machine since a large instance may require additional resources to instantiate and support the machine image (e.g., operating system and associated applications) that is part of the virtual machine instance. If a host machine comprises fewer computing resources (e.g., uses older technology such as outdated or obsolete processors and/or storage devices), the host machine may only include a small number of slots for allocation of a virtual machine instance. Alternatively, a newer host machine, with greater computing resources, may be able to support additional slots and thus accommodate additional virtual machine instances.

The distributed computer system 202 may also include additional subsystems that support the instantiation, operation and placement of guest virtual machines. For example, the additional subsystems may include a management subsystem 224 which may include a customer interface, such as a web service interface through which web service API calls may be made to the distributed computer system 202. The management subsystem may comprise a collection of computing devices that are collectively configured to perform operations in connection with management of host machines and guest virtual machines, such as operations discussed in detail throughout the present disclosure and, in some embodiments, additional operations including, operations in connection with accounting, logging and the like. Further, the distributed computer system 202 may include a machine image repository 226, which may comprise one or more data storage devices that store guest virtual machines in a serialized format for instantiation on host machines. The customer interface of the management subsystem 224 may be public facing (e.g., accessible over the Internet). Further, the management subsystem 224 and machine image repository 226 may be components in a network that connects the host machines to enable the management subsystem to perform its operations. The management subsystem 224 may, for instance, process requests to instantiate virtual machine instance(s) by selecting a machine image from the machine image repository 226, which may be specified in the request or which may otherwise comply with one or more parameters in the request and cause the selected machine image to be loaded on a host machine.

Figure 3:
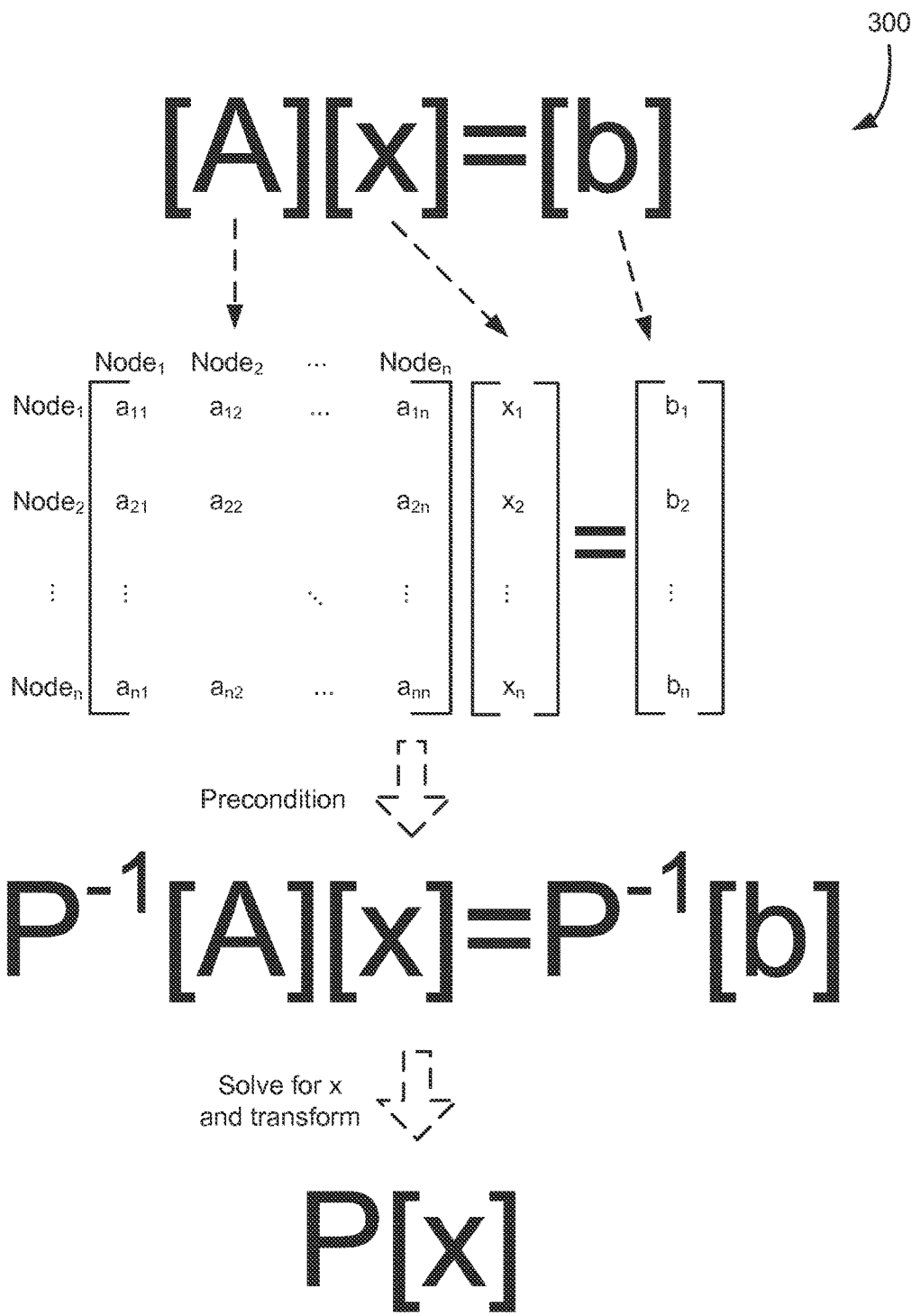
FIG. 3 shows a diagram illustrating various aspects of the present disclosure.

As noted, embodiments of the present disclosure relate to efficient implementation for calculating a blended connectivity metric for use in making placement decisions. FIG. 3, accordingly, illustrates an overview of various techniques that may be used to achieve such an efficient implementation. As illustrated in FIG. 3, techniques utilized herein utilize linear transformations which may be implemented using matrix algebra. For example, in an embodiment, various techniques herein involve solving a system of linear equations. In an embodiment, a matrix A is constructed based at least in part on a network of nodes in the network, where each node may represent a host machine in the network having capacity to instantiate a virtual machine.

In an embodiment, the matrix A is constructed as, or otherwise based at least in part on, the Laplacian of the network graph (i.e., a graph constructed with vertices and edges between the vertices, where the edges between pairs of nodes represent connections between corresponding nodes in the network) of the network. It should be noted that the vertices in the network graph may also be referred to as nodes and that, from context, it is understood whether the term node corresponds to a device in the network or a vertex in the graph.

In an embodiment, the nodes in a network are enumerated, where the enumeration may be arbitrary. As illustrated in FIG. 3, each column of the matrix A corresponds to a node in the network and each row in the matrix A corresponds to a node in the network. In other words, each node in the network corresponds to both one row and one column. Further, as illustrated, the $i^{th}$ column in the matrix A corresponds to the $i^{th}$ node in the enumeration of the network nodes and the $j^{th}$ row in the matrix A corresponds to the $j^{th}$ node in the enumeration of the network nodes. In an embodiment, each entry on the diagonal of the matrix A is or is otherwise based at least in part on the degree of the corresponding vertex in the network graph. Entries off the diagonal of the matrix A, in an embodiment, are constructed to indicate connectivity between corresponding nodes, where connectivity may be measured in units of bandwidth (e.g., bytes per period of time). For instance, an entry $a_{ij}$ in the matrix A is constructed based at least in part on connectivity between the $i^{th}$ and $j^{th}$ nodes in the network. As such, the matrix is symmetric and positive semi-definite. In an embodiment, entries may be entered in units of bits per second that enables efficient computation by dropping fractions of bits per second in calculations without undue effect on results, although other techniques may be used. As illustrated in FIG. 3, various techniques of the present disclosure involve obtaining solutions to the equation Ax=b, where A is a matrix described above, x represents a vector comprising variables for which to solve, and b represents placement requirements (constraints) that are based at least in part on network connectivity.

Vector b, which like matrix A is a known quantity in the equation Ax=b, may be constructed by identifying machines in the network which may interact with the machines being placed. In an embodiment, vector b is a vector measuring the strength of the interaction of the machines in the network with computer system resources. Vector b may be determined by examining such factors as the location of inputs and outputs, size of inputs and outputs, bandwidth required for inputs and outputs and/or other such factors. Vector b may be indexed as above, where the $i^{th}$ row of the vector may correspond to the strength of the interaction with the $i^{th}$ machine in the network. Larger values may be placed in those locations where stronger interactions with computer system resources may occur. For example, consider a simple three-node network where node one is a simple output node, node two is located near a primary data store with a high input bandwidth requirement and node three has no inputs or outputs. In such an example, vector b may be constructed as (−50, 1000, 0) representing the simple output for node one, a high-bandwidth input for node two and no interaction for node three. The values in vector b may be based on bandwidth, or on latency, or on connection complexity or on a combination of these and/or other such values.

In some embodiments, vector b may be used to induce artificial placements as well. In the above example, vector b may be initially constructed as (−50, 1000, 0) representing the simple output for node one, a high-bandwidth input for node two and no interaction for node three. With such a construction, node three has very little weight with respect to the placement decisions but, for example, node three may have a large amount of spare capacity and/or available resources associated with and/or nearby node three. In such an example, vector b may be altered by adjusting the value in the $3^{rd}$ row of vector b to reflect this spare capacity by, for example, adding 100 to the value, making the altered vector b equal to (−50, 1000, 100). Vector b may also be altered to reflect other benefits and/or costs so as to alter the base vector b to bias placement.

In an embodiment, solutions to the equation Ax=b (i.e., solving for the vector x) are used to make placement decisions. Solutions may be calculated in various ways in various embodiments, such as using Gaussian elimination or iterative solving techniques, such as the Jacobi and Gauss-Siedel (Liebmann) methods of iteratively solving linear systems of equations. In various embodiments, various techniques are utilized to enable efficient determination of a solution. In some examples, preconditioning techniques are utilized to transform the system of equations into a system of equations for which iterative techniques are more likely to efficiently arrive at a solution. As illustrated in FIG. 3, the inverse $P^{-1}$ of a preconditioner matrix, P, is constructed to serve as a transformation of the matrix A. As discussed in more detail below, P is constructed to be invertible so that a solution x can be found in the transformed system of equations using the inverse of P and the P can be used to transform the solution into Px, a solution to the original system of equations.

In some embodiments, the solution x may not be an exact solution, either because of the numerical precision of the transformations, or because an iterative solution to solving the system of equations may be used or because of some other such reasons. In such embodiments, an approximate solution may be determined based on the magnitude of the difference between Ax and b. The value for this magnitude, $\|Ax-b\|$ (where A is the matrix A as above, x is the vector x as above and b is the vector b as above), is the length of the vector from the origin to the point in the vector space. For example, in a 2-dimensional space, the length of the vector (3, 4) may be computed as the square root of $3^2+4^2$, which is the square root of 25, which is 5. In some embodiments, different vector norms may be used to compute the value of a magnitude of a vector such as, for example, a "Manhattan" or "taxicab" norm. When an exact solution x to the equation Ax=b is found, $\|Ax-b\|$ is zero. In an embodiment where an exact solution may not be determined, an approximate solution may be found by constraining an acceptable solution to the equation $\|Ax-b\|$ to be less than some threshold value. The threshold value may be a constant computer system-defined value, or may be proportional to $\|b\|$, the magnitude of the b vector or may be based on some other computer system-defined value. In an embodiment where an acceptable solution is less than a threshold value which is proportional to the magnitude of b, the proportional value may determine the termination condition of the iterative solution algorithm. In such an embodiment, a smaller proportional value may yield more accurate results but an iterative solution may take more time and/or may be more computationally expensive. A larger proportional value may yield less accurate results but an iterative solution may take less time and/or may be less computationally expensive.

In some embodiments, the proportional value may also be used to determine a number of allowed iterations to reach a solution. For example, as mentioned herein, a lower proportional value may require additional iterations to converge to a solution and may converge more slowly and thus a computer system may be defined with maximum number of iterations that may be allowed before exiting the solution iteration loop. When a computer system is defined to allow only a set number of iterations before exiting the solution iteration loop, the computer system may take a variety of mitigation approaches in response to not reaching a sufficiently accurate solution. For example, the computer system may terminate the solution or may take the existing approximate solution as a reasonable enough approximation. In some embodiments, the computer system may mitigate by altering the problem set, including such approaches as computing or re-computing a preconditioning matrix or simplifying the problem by, for example, reducing the graph by using an appropriate subgraph. As may be contemplated, the methods for approximating a solution and/or for mitigating solutions that fail to converge are merely illustrative examples and other approximation and/or mitigation approaches may be considered as within the scope of the present disclosure.

Once an at least approximate solution x for the equation Ax=b (or an at least transformed approximate solution Px for the equation $P^{-1}$ Ax=$P^{-1}$b) is found, the solution may be used to determine appropriate candidate nodes for placement of one or more machines using one or more fine-grained placement algorithms. It should be noted that, in a typical network where there may be millions of nodes, one of the reasons for constructing the equation Ax=b may be to reduce the number of candidate nodes for placement to a smaller and/or more manageable number. A large value in the $i^{th}$ row of the solution vector indicates a node that may be more important in terms of potential placements. The size of the important node set may be further reduced by, for example, selecting all nodes whose absolute magnitude exceeds a computer system-defined threshold value or by scaling the values and selecting all nodes whose relative (scaled) magnitude exceeds a computer system-defined threshold value.

Figure 4:
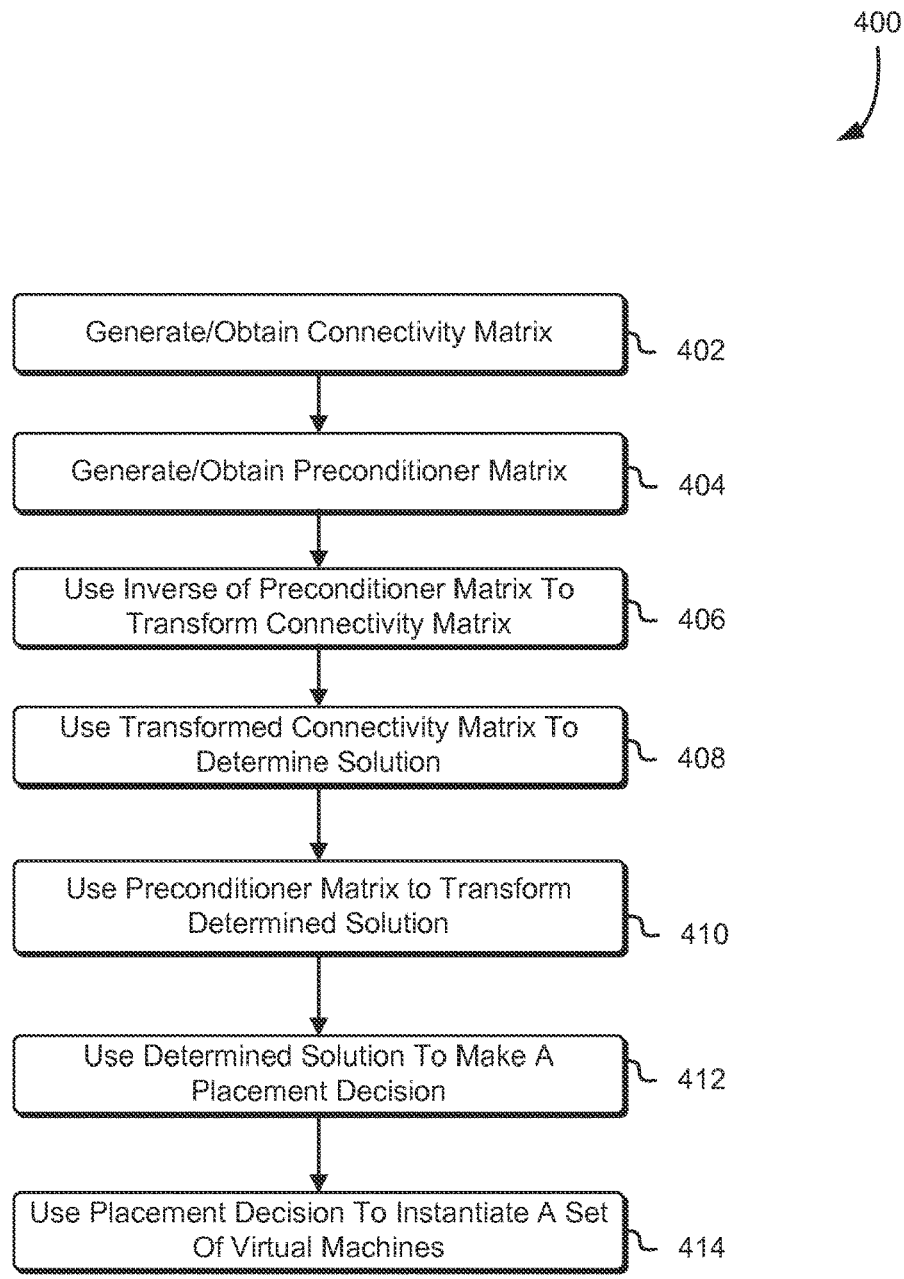
FIG. 4 shows an illustrative example of a process for making virtual machine placement decisions in accordance with at least one embodiment.

FIG. 4 shows an illustrative example of a process 400 for placing virtual machines in accordance with at least one embodiment. The process may be performed by any suitable computer system, such as a computer system implementing a placer process such as described above. As illustrated in FIG. 4, the process 400 includes generating or otherwise obtaining 402 a connectivity matrix for a network having nodes represented by the matrix and generating or otherwise obtaining 402 placement requirements (e.g., minimum bandwidth between pairs of nodes to be placed). The connectivity matrix may be based at least in part on a Laplacian of a graph representing the matrix, such as described above in connection with FIG. 3. Values for connectivity (e.g., bandwidth between nodes in the network) may be measured and stored to build the connectivity matrix or, for at least some of the nodes, the values for connectivity may be assumed, where assumptions may be based at least in part on known characteristics of the computing devices implementing the nodes in the network. For instance, for pairs of devices connected in the network having known capabilities, bandwidth values may be assumed, where the assumption may be based on capabilities of the devices in the pair or measurements of other similar pairs (e.g., pairs between the same model devices).

As noted, the connectivity matrix may be used to represent one side of a system of linear equations that is solvable using various techniques, such as Gaussian elimination or iterative methods described above. However, to make the determination of solutions more efficient, the process 400 includes generating or otherwise obtaining (e.g., from another device) 404 a preconditioner matrix. Example techniques for generating a preconditioner matrix are discussed in more detail below. The inverse of the preconditioner matrix may be used to transform 406 the connectivity matrix. Transformation of the connectivity matrix using the inverse preconditioner matrix may be performed by computing the matrix product of the inverse of the preconditioner matrix and the connectivity matrix. Entries in the product may be computed, for example, such that the entry in the $i^{th}$ row and the $j^{th}$ column is calculated as the vector dot product of the $i^{th}$ row of the inverse of the preconditioner matrix with the $j^{th}$ column of the connectivity matrix.

Once the preconditioner matrix has been used to transform the connectivity matrix, the process 400 may include using 408 the transformed connectivity matrix to determine a solution to the series of equations, thereby creating an approximation of a connectivity metric. The solution may be determined using any suitable techniques for solving systems of linear equations, including those discussed above, for the placement requirements. The determined solution may then be transformed using the preconditioner matrix 410 so that the determined solution has the same scale, precision and/or basis as the original system of equations. The solution to the series of equations may then be used to make 412 a placement decision by using the solution to determine where to place a set of virtual machines. Once a placement has been determined 412, the placement decision may be used to instantiate 414 a set of virtual machines, such as by loading the virtual machines onto the host machines identified in the placement decision.

Figure 5:
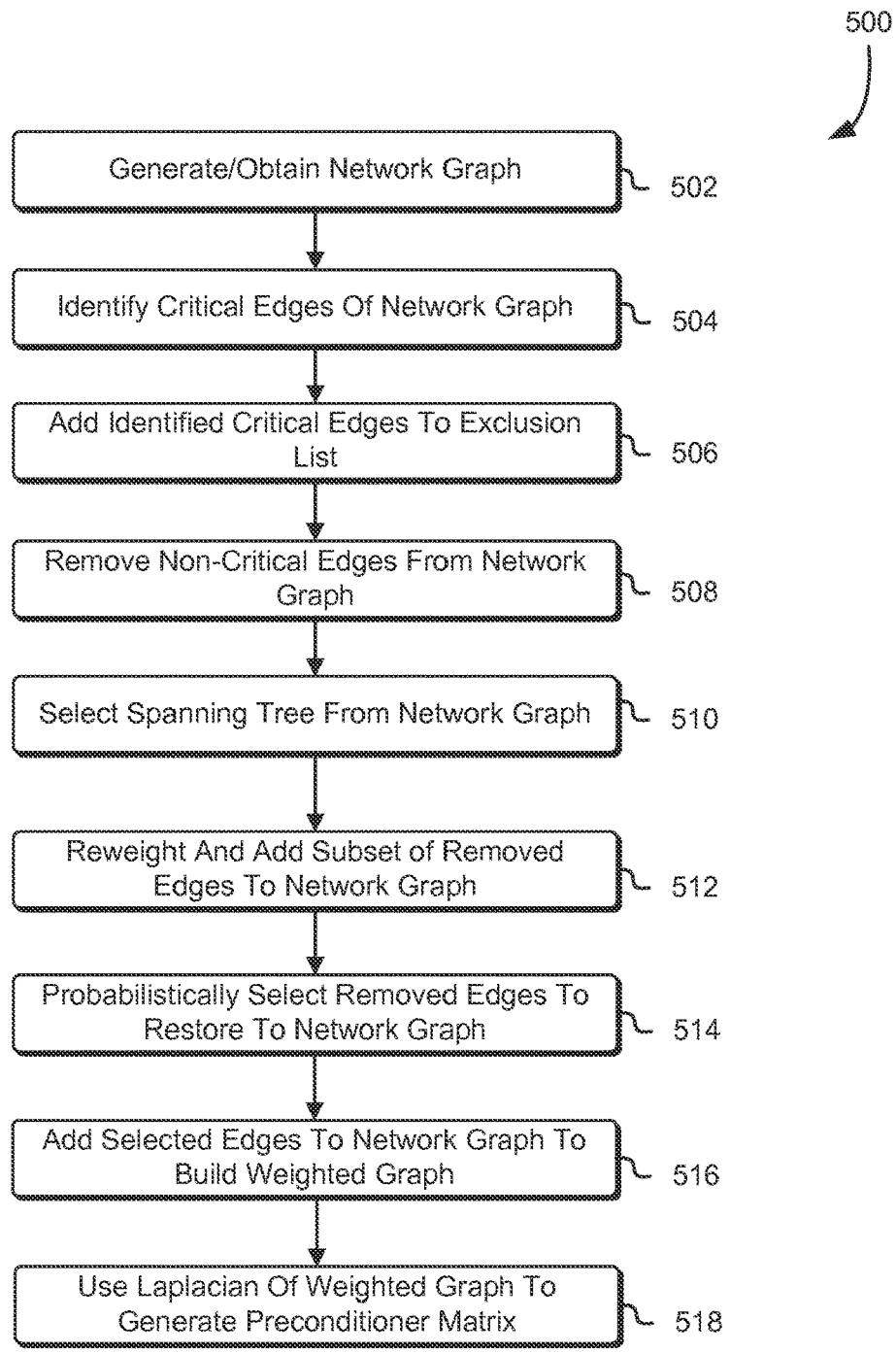
FIG. 5 shows an illustrative example of a process for generating a preconditioner matrix in accordance with at least one embodiment.

As discussed, techniques of the present disclosure involve preconditioning a system of linear equations to improve the efficiency. FIG. 5 shows an illustrative example of a process 500 for generating a preconditioner matrix in accordance with at least one embodiment. A preconditioner matrix produced using techniques described in connection with FIG. 5 may be used in the process 400 described above in connection with FIG. 4. The process 500 may be performed by any suitable computer system, such as the computer system that performs the process 400 described above in connection with FIG. 4.

Figure 6:
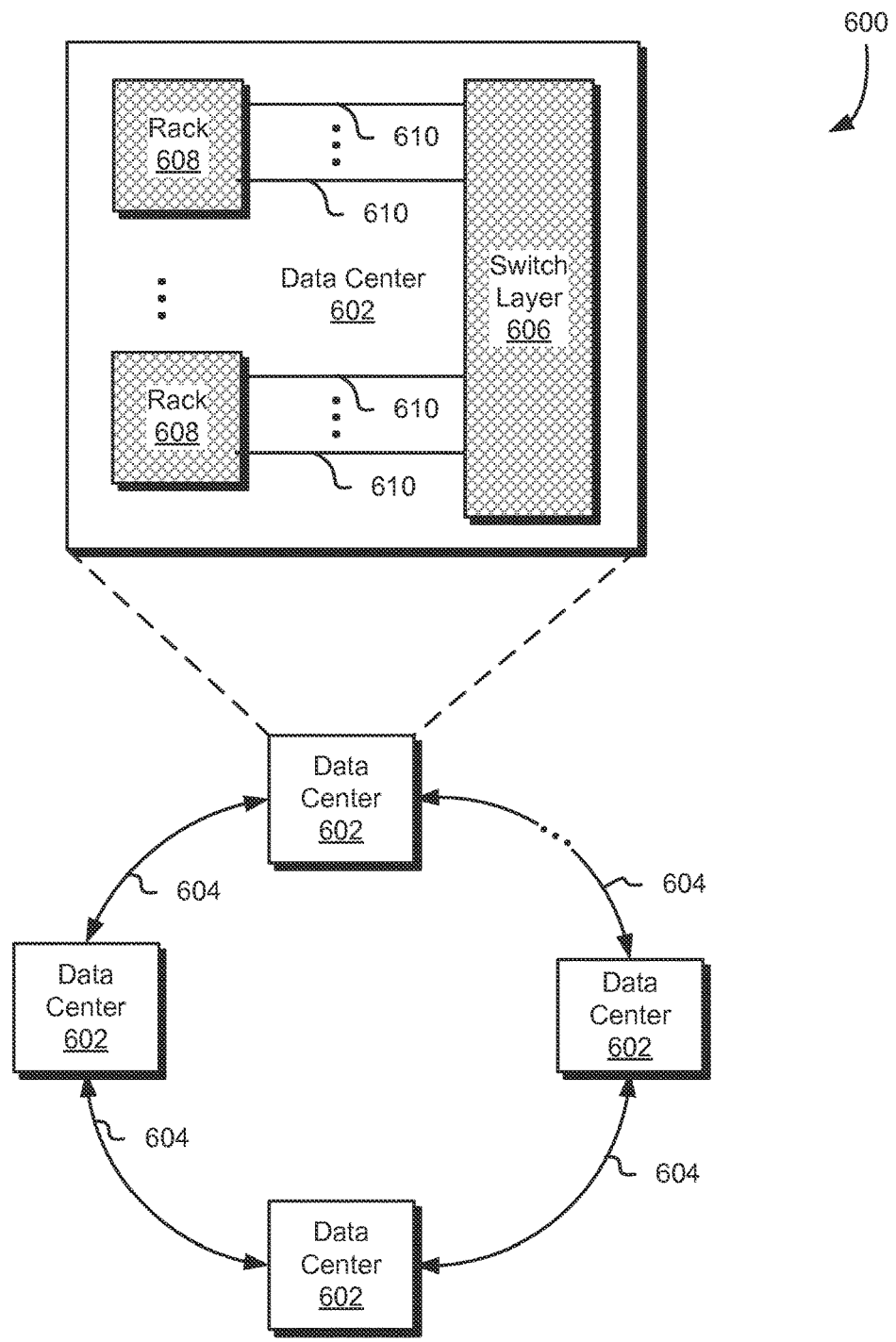
FIG. 6 shows an illustrative example of an environment in which various embodiments may be practiced.

In an embodiment, the process 500 includes generating or otherwise obtaining 502 a network graph (i.e., an electronic representation of a network graph that includes information encoded in a data structure that encodes the network graph), such as described above. Critical edges of the network graph may then be identified 504. Critical edges may be edges that are specified as critical because of their role in the network and, generally, where the edges are located relative to other edges. Turning briefly to FIG. 6, a representation of a distributed computing environment is shown. In this particular example, the computing environment 600 includes a plurality of data centers 602 which are data processing facilities that house various computing resources of an organization, such as a computing resource service provider that provides a virtual computer system service, among possibly other services, that operates host machines to implement virtual machines on behalf of customers of the service provider. The customers may, for instance, transmit API calls to a web service interface to cause the service provider to instantiate virtual machines and, as preparation for instantiation, making a placement decision utilizing various techniques described herein.

As illustrated in FIG. 6, the data centers 602 have communication connections 604 between them to enable efficient communications between devices in different data centers 602. While a single connection between pairs of data centers 602 is illustrated, there may be redundant connections between the same two data centers 602. As illustrated in FIG. 6, the data centers 602 are arranged in a ring structure to enable multiple paths of communication from one data center to another, although other topological configurations are considered as being within the scope of the present disclosure, such as topological configurations in which communication spokes are present in a ring structure.

Also in FIG. 6, a single data center may include various network devices that correspond to nodes in a network graph. For example, a data center may comprise a switch layer 606 that comprises a plurality of densely connected network switches, each corresponding to a node in the network. The switches in the switch layer 606 may receive communications from outside of the data center 602 to an appropriate rack 608, which may include a top-of-rack switch and a plurality of host machines. There may be a set of connections 610 between the switch layer 606 and the racks 608 which have less redundancy than connections within the switch layer 606 and/or racks 608. The host machines on a rack 608 as well as the devices in the switch layer may be densely connected relative to the connection density between the switch layer 606 and the racks 608 and/or between data centers 602 and, therefore, there may be a relatively larger number of alternate communication paths within a rack and within the switch layer than between racks and the switch layer and between data centers.

Returning to FIG. 5, as a result of different connection densities within the network, edges of the network graph corresponding to lower connection densities (such as connections between racks and a switch layer and connections between data centers) may be identified as critical edges. Other connections may also correspond to edges identified as critical. In this manner, the applications of the techniques described herein are less likely to result in unusable solutions. As illustrated in FIG. 5, edges identified as critical may be added 506 to an exclusion list, which may comprise identifiers of the critical edges. With an exclusion list being referenced, performance of the process 500 may include removing 508 non-critical edges (i.e., edges not identified as critical edges) from the network graph to form a simplified graph. As its name implies, the exclusion list may be used as a reference for preventing removal of edges from the network graph.

In an embodiment, removing 508 non-critical edges is performed by performing an iterative process of probabilistically removing non-critical edges and checking for connectivity breaks between sets of deletions. Deletions may be made until a threshold is met, where the threshold may be that the graph is left with a number of elements that is a constant times the number of nodes, where the constant may be greater than one (e.g., the constant may be 4). Once the connectivity graph is simplified through the removal of non-critical edges, a spanning tree of the network graph may be selected 510. A spanning tree may be selected using any suitable algorithm, such as a depth-first search, a breadth-first search or another algorithm. It should be noted that instead of selecting a spanning tree, variations of the present disclosure include those where a subgraph of a spanning tree is selected.

As illustrated in FIG. 5, a set of edges are reweighted and added back to the network graph. In an embodiment, edges are reweighted and added back so that, once added, the added edges are each identified as having bandwidth that approximates a set of removed edges corresponding to alternate connections between nodes. In an embodiment, such is accomplished by assigning weights and probabilities to some or all of the removed edges of the network graph. In an embodiment, each removed edge that is assigned a weight and probability based at least in part on the bandwidth corresponding to that edge. For example, the weight may be assigned to be proportional to the bandwidth corresponding to the edge. The probability may be assigned such that, the higher the bandwidth that corresponds to the edge, the higher the probability the edge will be selected in a probabilistic selection process that uses the assigned probability.

In some embodiments, where edges may be selected based at least in part on their assigned weights, the edge selection may include consideration of replacement probabilities, wherein the weight of an edge may be based at least in part on the assigned probability. When such an edge is multiply selected by the selection process it may also have its weight correspondingly increased in a manner that is proportional to the number of times it may be selected so that, for example, an edge that is selected three times may have its weight increased to three times the base weight for that edge. In some embodiments, an edge that is multiply selected by the selection process may also have the edge duplicated so that, for example, an edge that is selected three times may instead have two additional edges added to the graph. In such an embodiment, the resulting graph may not be a proper subgraph of the original graph and, as such, the resulting graph may require that any duplicated edges be coalesced into a single edge before any processing and/or placement decisions may be made.

Once weights and probabilities have been assigned to removed edges of the network graph, the process 500 may include probabilistically selecting 514 removed edges to restore to the network graph. For example, a stochastic selection process may select 514 the removed edges using the probabilities that were assigned. Selected edges may then be added 516 to the network graph. When added 516 to the network graph, the process 500 may include boosting (i.e., increasing) the weight of the added edges. Some or all added edges may, for instance, have weights multiplied by the inverse of their corresponding probabilities or, generally, may have weights increased based at least in part on the corresponding probabilities. Addition of edges with reassigned weights may result in a graph referred to as a weighted graph. The Laplacian of the weighted graph may be used 518 to generate a preconditioner matrix, such as described above. The preconditioner matrix may be, for instance, the inverse of the Laplacian of the weighted graph or otherwise based at least in part on the Laplacian of the weighted graph.

Figure 7:
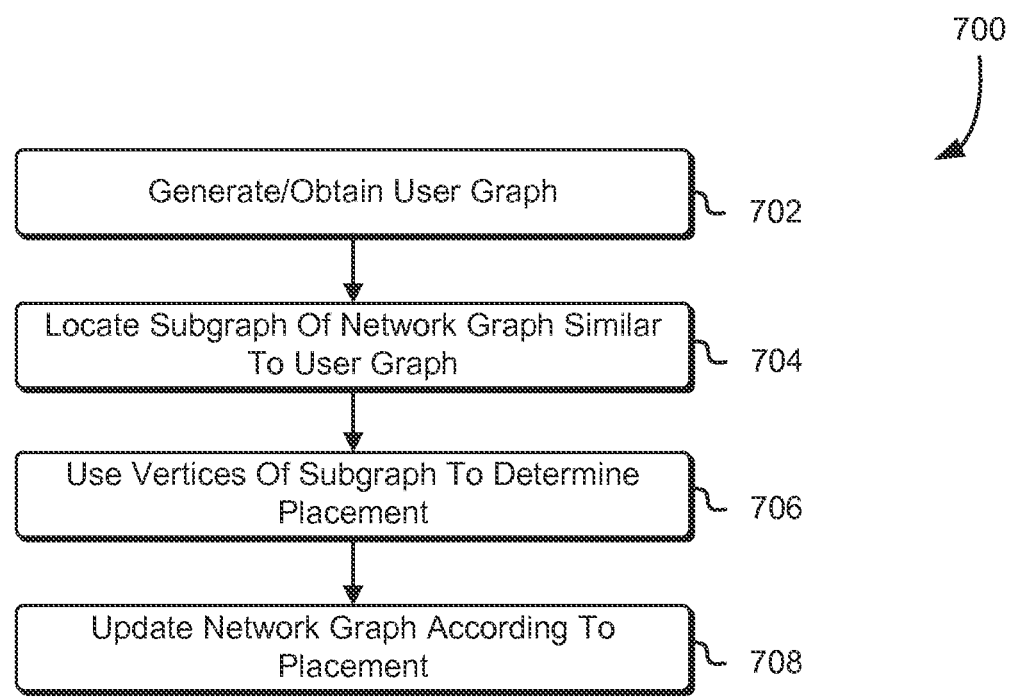
FIG. 7 shows an illustrative example of a process for making a placement decision in accordance with at least one embodiment.

As noted above, various embodiments of the present disclosure utilize a network graph to make placement decisions for placing guest virtual machines. FIG. 7, accordingly, shows an illustrative example of a process 700 for determining a placement from a network graph. The process 700 may be performed by any suitable computer system, such as a computer system implementing one or more placement processes, such as described above. In an embodiment, the process 700 includes generating or otherwise obtaining a user graph. A user graph, in an embodiment, is a graph that is generated based at least in part on components of a network for which placement is to be performed. The network for which placement is to be performed may comprise, for example, a network of virtual machines to be instantiated in a manner satisfying connectivity requirements which may, for instance, be specified (e.g., by API call or otherwise) by a customer or other entity for which the network is to be constructed. In other words, each vertex in the user graph may correspond to a virtual machine image to be instantiated using a machine in a network (e.g., the network represented by the matrix A, discussed above). The requirements may be specified in various ways, such as by default, by roles of the components (e.g., web server, application server, database and the like) or in other ways.

In an embodiment, once the user graph has been obtained 702, the process 700 includes locating 704 a subgraph of the network graph that meets or exceeds at least one specified measurement of graph similarity. The metric of similarity may be, for instance, the Gromov-Hausdorff distance between metric spaces corresponding to the user graph and the subgraph, where the metric spaces use the weights on the edges of each graph as distances. The subgraph may be located 704 using any suitable process for locating subgraphs, such as by searching the network graph for subgraphs and calculating the metric, by performing a search of matrix a matrix representation (e.g., Laplacian) of the network graph and/or generally performing any process for identifying a subgraph having particular characteristics (e.g., similarity). Further, multiple subgraphs may be identified and a selection may be made from the identified subgraphs. The subgraphs may be ranked (e.g., by similarity) and a highest ranked subgraph may be selected, a selection may be made probabilistically (e.g., randomly) or selection may be made in another way.

Once a suitable subgraph has been located 704, the process 700 may include using 706 the vertices of the located subgraph to determine a placement. In an embodiment, each vertex of the located subgraph corresponds to a machine in the network. Accordingly, this correspondence may be used to determine which machine to use for instantiation of which virtual machine image. Vertices in the user graph may be matched to vertices in the network graph, thereby associating machines in a network with virtual machine images to be instantiated using the machines. While not illustrated in FIG. 7, the process 700 may also include causing instantiation of the determined placement, such as by transmitting instructions to a computer system configured to process the instructions and, accordingly, select suitable virtual machine images and cause the virtual machine images to be loaded to the machines in the network identified in the placement and cause the virtual machine images to be booted to thereby provide operating guest virtual machine instances.

Once a placement decision has been made 706, the process 700 may include updating 708 the network graph in accordance with the placement. Updating 708 the network graph in accordance with the placement may be performed in various ways in accordance with various embodiments. For example, one or more data structures populated with data representing the network graph may be modified to indicate the reservation of bandwidth for the placement. As discussed above, the network graph may be represented in matrix form (i.e., by an appropriate data structure encoding a matrix) with values based at least in part on a connectivity measure, such as bandwidth. Appropriate values in the matrix may be modified (e.g., decreased) in accordance with the bandwidth reservations caused by the placement. For a Laplacian, as an example, the off-diagonal entries corresponding to nodes affected by the bandwidth reservation may be modified in accordance with the reservation.

Once the network graph has been modified, the network graph may be used again to make additional placement decisions which may utilize techniques discussed above. For example, in the context of a service provider, the updated network graph may be utilized to make a placement decision for the same or a different customer for which a placement decision was just made. Each use of the network graph to make a placement decision may result in another update to the network graph. Further, as the network changes as a result of events other than placement (e.g., with the addition and/or removal of machines from the network or the unavailability of machines due to previous placement(s)), the network graph and associated data structures may be updated accordingly.

As noted, techniques described herein are illustrative in nature and numerous variations of the techniques described herein are considered as being within the scope of the present disclosure. For example, the above description describes techniques for generating a preconditioner matrix using probabilistic methods. As a result, different applications of such techniques may result in different preconditioner matrices. In various embodiments, multiple preconditioner matrices are determined, such as using the techniques discussed above. The preconditioner matrices may be scored and a preconditioner matrix may be selected based at least in part on its score. In an embodiment, a preconditioner matrix is scored based at least in part on two factors: the number of edges in a graph represented by the preconditioner matrix (e.g., by considering the preconditioner matrix or its inverse as the Laplacian of a graph) and a measurement of how well the preconditioner matrix approximates the connectivity matrix (i.e., how well the graph represented by the preconditioner matrix approximates the network graph). The first factor may be determined based at least in part on the sparsity of the preconditioner matrix. The second factor (i.e., the measure of how well the preconditioner matrix approximates the connectivity matrix) may be calculated using probabilistic techniques.

Figure 8:
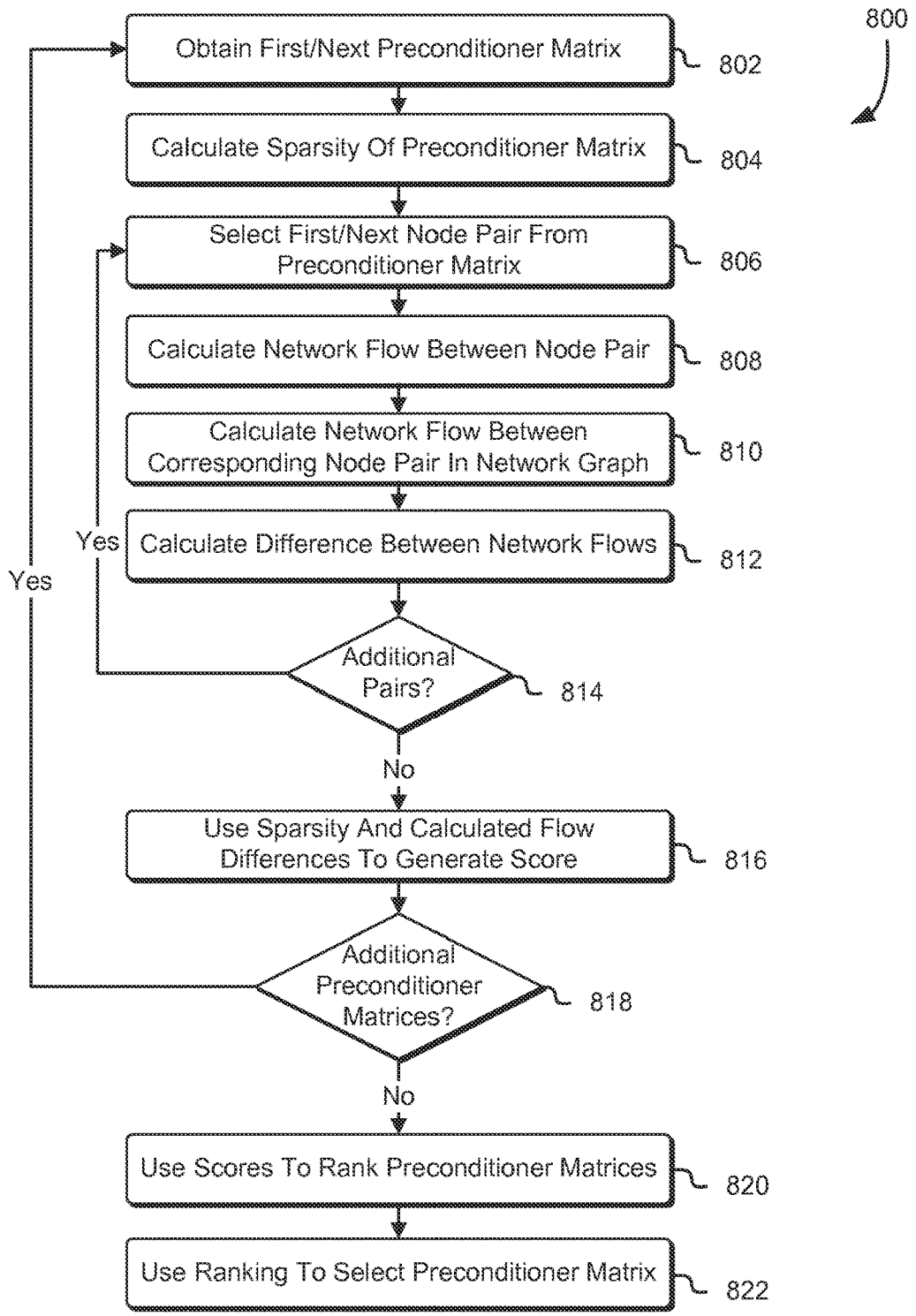
FIG. 8 shows an illustrative example of a process for selecting a preconditioner matrix in accordance with at least one embodiment.

FIG. 8 shows an illustrative example of a process 800 for selecting a preconditioner matrix in accordance with an embodiment. The process may be performed by any suitable computer system, such as a computer system implementing one or more placement processes, such as described above. In an embodiment, the process 800 includes obtaining 802 a first preconditioner matrix, where obtaining the matrix may be performed in various ways, such as by generating the preconditioner matrix (e.g., using techniques described above) or by obtaining an electronic representation of the preconditioner matrix that has been pre-generated. A sparsity value of the preconditioner matrix may then be calculated 804. The sparsity may be calculated, for example, using the number of non-zero entries relative to the number of zero entries or by calculating the density of a graph represented by the preconditioner matrix.

The process 800 may include selecting 806 a first node pair from the preconditioner matrix (i.e., selection of an off-diagonal non-zero entry corresponding to two machines in the network graph), where the selection may be made probabilistically (e.g., randomly or with probabilities based at least in part on the values in the matrix, where higher values correlate to higher probabilities of selection). Once the node pair has been selected 806, the process may include calculating 808 the network flow between the selected node pair. The network flow may be calculated based at least in part on the aggregated bandwidth of distinct paths (in a graph represented by the preconditioner matrix), ignoring cycles, between the machines represented by the selected nodes. The network flow may also be calculated 810 for the same nodes, but using the network graph instead of the simplified graph represented by the preconditioner matrix. The difference in the calculated network flows may be calculated 812 to determine an error indicating how well the graph represented by the preconditioner matrix approximates the network graph, where lower error correlates to better approximation.

As indicated in FIG. 8, the process of selecting a node pair and using the selected node pair to calculate an error value may be repeated for multiple node pairs. Accordingly, as illustrated in FIG. 8, determinations may be made 814 whether to select additional node pairs and perform the error calculation again. The determination may be made based at least in part on a predetermined number of node pairs to be selected, where the predetermined number may be based at least in part on the number of nodes in the network graph or, generally, determined so as to limit the number of calculations performed (e.g., so that performance of the process 800 does not unduly reduce the computational advantages achieved by the techniques described herein).

The node pair selection process may repeat until determined 814 to not select an additional node pair from the preconditioner matrix. The sparsity and calculated flow differences may be used to generate 816 a score for the preconditioner matrix that was obtained 802. The score may be calculated in various ways in accordance with various embodiments. For example, the score may be calculated as a linear (or non-linear) combination of the sparsity and the calculated error values such that increases in sparseness of the preconditioner matrix correlates with increases in the score and an increase in an error value correlates with a decrease in the score. Generally, the score can be calculated as a function of the sparsity and error values.

A determination may be made 818 whether there are additional preconditioner matrices and, if determined 818 that there are additional preconditioner matrices, then an additional preconditioner matrix may be obtained 802 and the process may repeat to generate 816 a score for the additional preconditioner matrix, such as described above. This sub-process may repeat until determined that there are no additional preconditioner matrices (e.g., scores for a predefined number of preconditioner matrices have been calculated). At this point, the process 800 may include using the scores to rank 820 the preconditioner matrices and using 822 the ranking to select a preconditioner matrix.

As discussed, variations of the above are considered as being within the scope of the present disclosure. For example, sub-processes of the process 800 may be parallelized to take advantage of parallel processing capabilities of a multi-processor computer system. As another example, instead of calculating a predefined number of preconditioner matrices, the process 800 may include generating preconditioner matrices until a preconditioner matrix having a score exceeding a predetermined threshold is generated. In this example, if a limit (e.g., time limit or a number of generated preconditioner matrices) is exceeded without identifying a preconditioner matrix with a score exceeding the threshold, a preconditioner matrix may be selected from a ranking of the ones that have been generated. In this manner, if a preconditioner matrix having a high score is fortuitously generated early, the process of selecting a preconditioner matrix can be completed more quickly, resulting in quicker placement decisions in some instances.

As another example of variations that are within the scope of the present disclosure, preconditioner matrices may be constructed in other ways. For instance, in some embodiments, a preconditioner matrix is generated by selecting preconditioner matrices, selecting from highest scoring preconditioner matrices and using above techniques to add edges to the selecting preconditioner matrices, rescoring and repeating until conditions for finishing this iterative process are fulfilled. The conditions may be based at least in part on sparsity and error values, such as described above. The sparsity may be used to generate a complexity score (which may be the sparsity or may be otherwise based at least in part on the sparsity) and the errors may be used to generate a fidelity score, which may be a function of the error values, such as an average. The iterative process of building preconditioner matrices may repeat until a decrease in sparsity results in less than a threshold improvement in fidelity. Other variations are also considered as being within the scope of the present disclosure.

Figure 9:
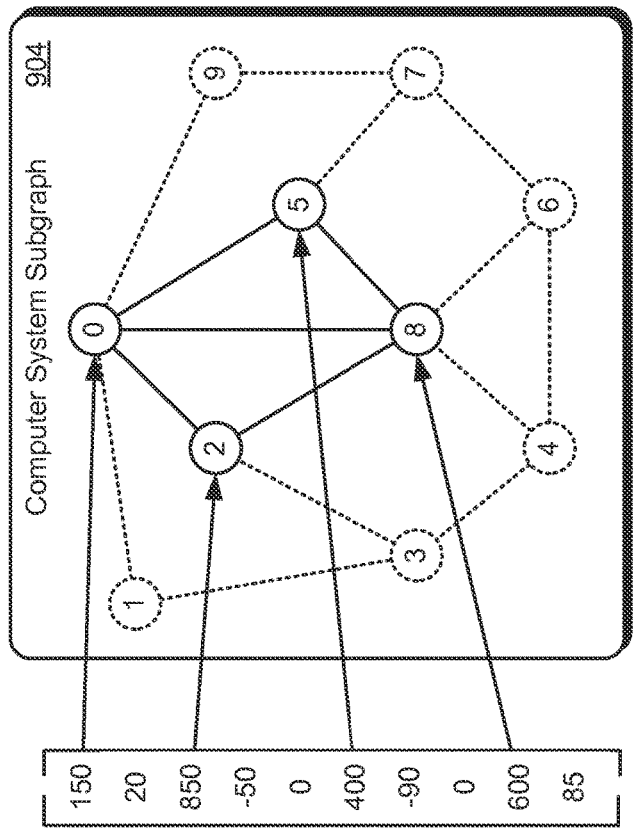
FIG. 9 shows an illustrative example of an environment where a set of network nodes may be reduced to a subset of network nodes in accordance with at least one embodiment.
Figure 9:
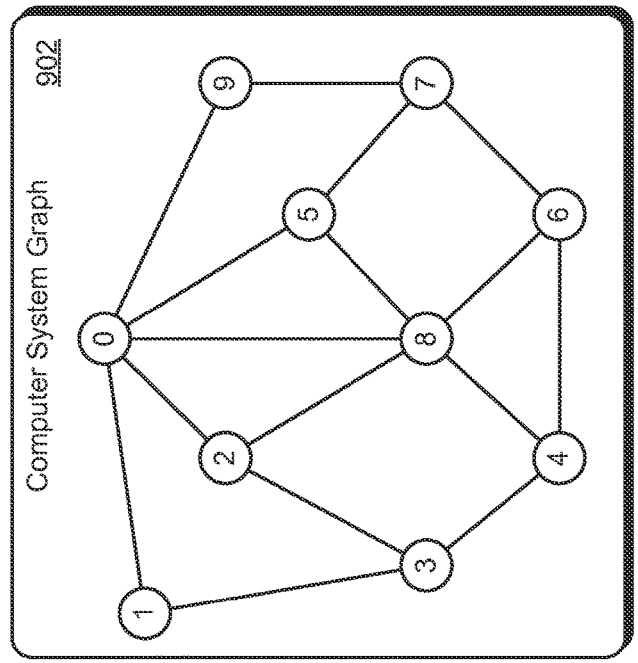

FIG. 9 illustrates an example environment 900 where a set of network nodes such as the set of network nodes described herein at least in connection with FIG. 3 may be reduced to a reduced subset of candidate placement nodes as described herein in accordance with at least one embodiment. A computer system graph 902 constructed with vertices and edges between the vertices, where the edges between pairs of nodes represent connections between corresponding nodes in the network, may have a subset of interesting or important nodes selected in order to create a computer system subgraph 904. In some embodiments, the reduced subset of candidate placement nodes may be selected by choosing those nodes which have an interest value that exceeds a certain computer system-defined threshold. For example, a solution P[x] (also referred to herein as "Px") 906 to the matrix equation described herein at least in connection with FIG. 3 may indicate the relative importance of the nodes in the graph based on the connection matrix A as described herein at least in connection with FIG. 3 and the weighting vector b also as described herein at least in connection with FIG. 3. The interesting and/or important nodes used to create the computer system subgraph of important nodes may be those nodes whose values exceed a certain threshold value. In some embodiments, the solution vector Px 906 may first be characterized, normalized, scaled and/or otherwise altered to produce uniform values between placement iterations. For example, the solution vector Px 906 may be scaled such that the lowest non-zero positive value equals one by, in this example, dividing by twenty.

Figure 10:
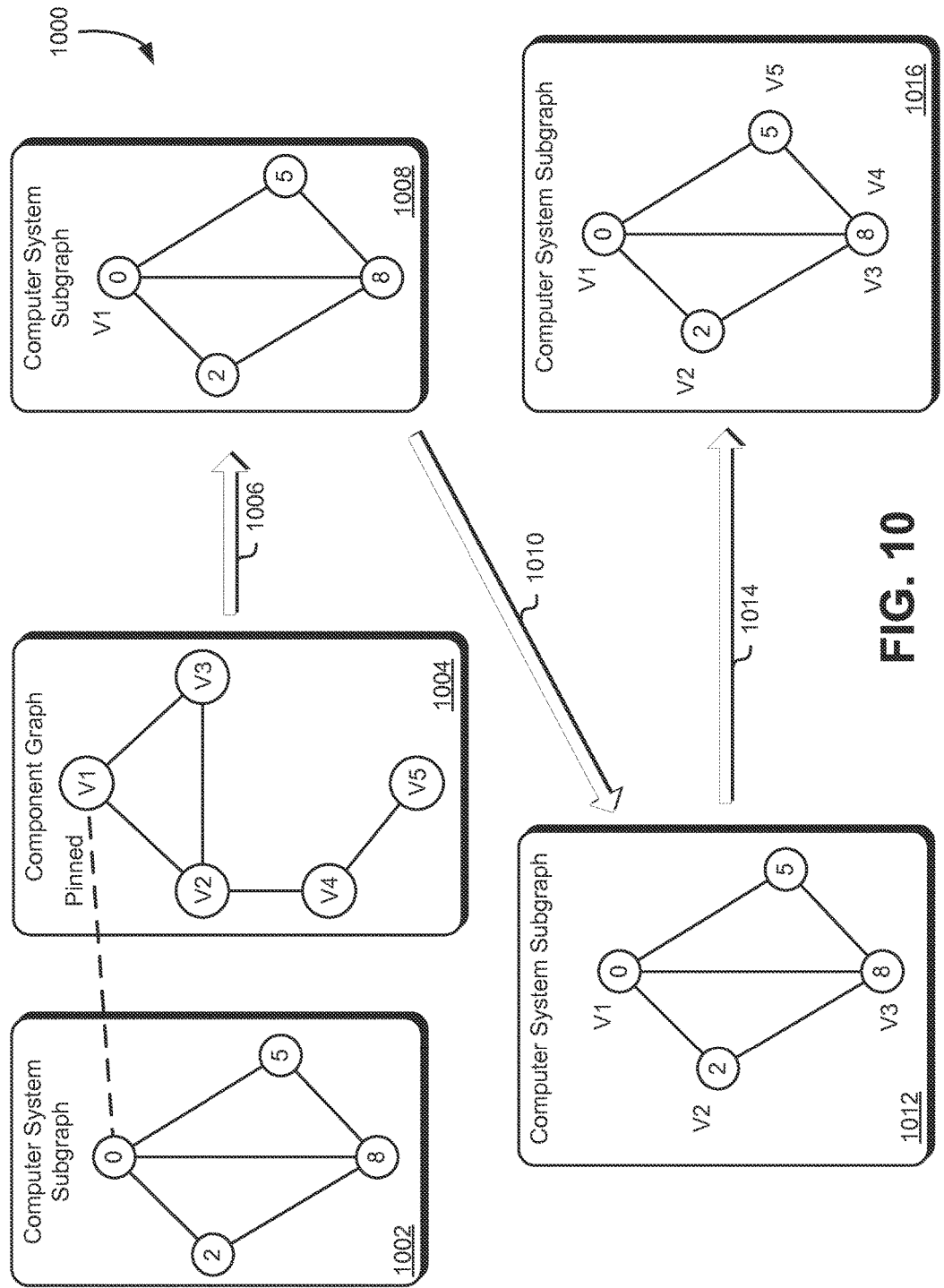
FIG. 10 shows an illustrative example of an environment where components may be placed in a computer system network in accordance with at least one embodiment.

FIG. 10 illustrates an example environment 1000 for placing components on distributed, virtualized and/or datacenter computer system environments, as well as the associated code running thereon as described herein at least in connection with FIG. 1 and in accordance with at least one embodiment. A computer system subgraph 1002 containing a reduced subset of candidate placement nodes as described herein at least in connection with FIGS. 3 and 9 may have one or more components within a component graph 1004 as described herein at least in connection with FIG. 3 placed within the computer system subgraph 1002. The one or more components may be pinned to one or more nodes within the computer system subgraph 1002, thus at least partially constraining the solution. In the example illustrated in FIG. 10, the component represented by node V1 in the component graph 1004 is pinned to the location represented by node 0 in computer system subgraph 1002. As a result of the pinning operation, represented by placement 1006, node V1 has been placed at the network location represented by node 0 in computer system subgraph 1008.

Next, the neighbor components of the component represented by node V1 may be placed in the computer system subgraph. The placement 1010 places the component represented by node V2 in the component graph 1004 (the first neighbor of node V1) in the location represented by node 2 in computer system subgraph 1008 and places the component represented by node V3 in the component graph 1004 (the second neighbor of node V1) in the location represented by node 8 in computer system subgraph 1008, resulting in computer system subgraph 1012. Finally, placement 1014 places the component represented by node V4 in the component graph 1004 (the neighbor of node V2) in the location represented by node 8 in computer system subgraph 1012 and places the component represented by node V5 in the component graph 1004 (the neighbor of node V4) in the location represented by node 5 in computer system subgraph 1012, resulting in computer system subgraph 1016. The solution represented in computer system subgraph 1016 may be a good solution based on it being a set of legal placements that satisfy all constraints. The solution represented in computer system subgraph 1016 may be also bad solution based on, for example, the overcrowding of the location represented by node 8 in computer system subgraph 1016.

Figure 11:
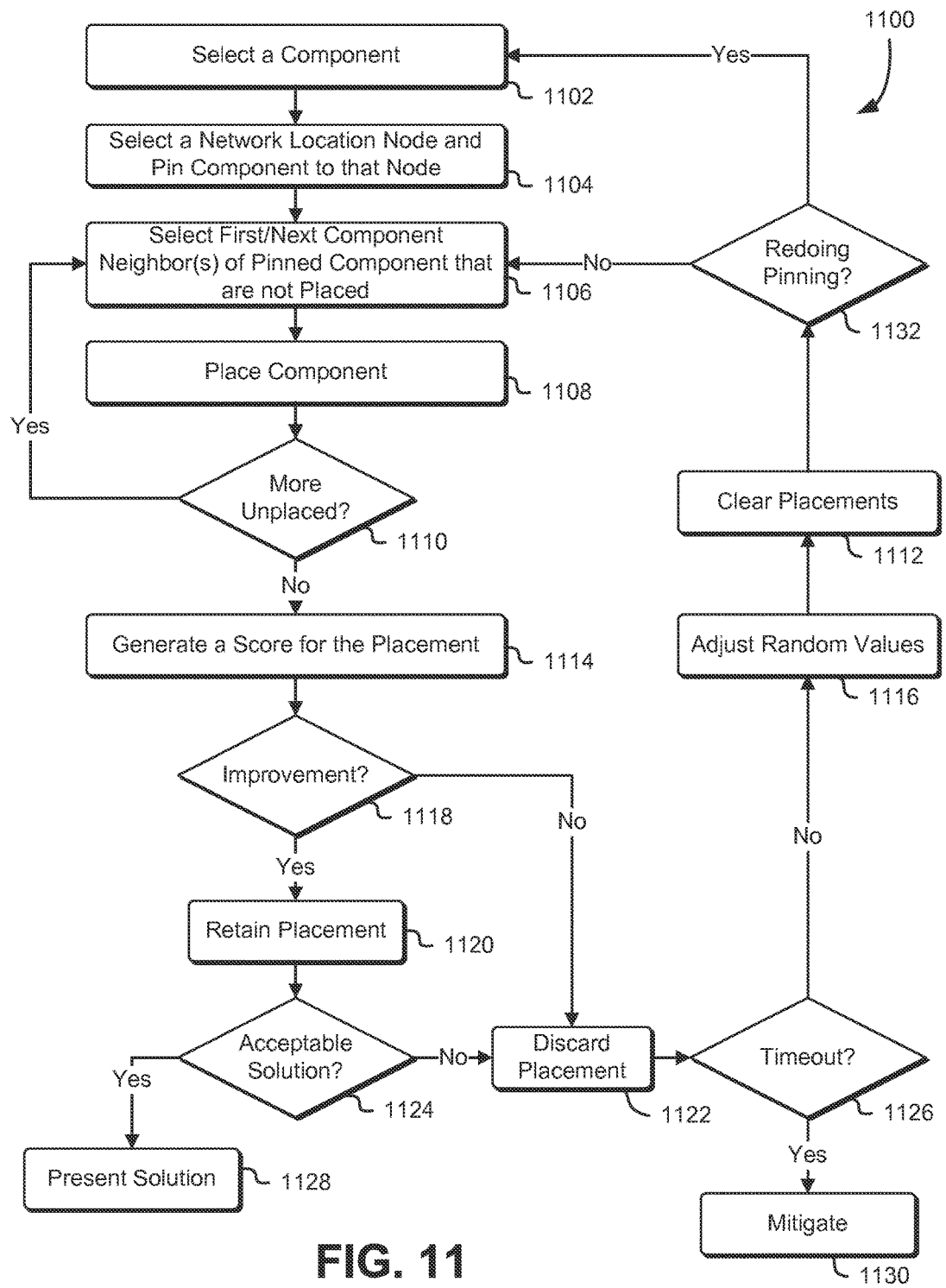
FIG. 11 shows an illustrative example of a process for iteratively optimizing the placement of components in accordance with at least one embodiment.

FIG. 11 shows an illustrative example of a process 1100 for iteratively optimizing the placement of one or more components within a computer system network as described herein at least in connection with FIGS. 1 and 10 and in accordance with at least one embodiment. The process 1100 may be performed by any suitable computer system, such as a computer system implementing one or more placement processes, such as described herein above. A placer may first select a component 1102 from the set of components that are ready to be placed, wherein the set of components is represented by a component graph such as the component graph described herein at least in connection with FIGS. 9 and 10 and in accordance with at least one embodiment. The placer may next select a network location node and pin the component to that node 1104 using a network graph representing a network such as the network graph described herein at least in connection with FIGS. 9 and 10. The placer may select the node randomly, or according to computer system-defined parameters, or according to weights and/or constraints associated with the components and/or the network nodes or according to a combination of these and/or other such factors. The placer may then select the first component that is a neighbor of the pinned component 1106 and place the component 1108 in an appropriate node. The appropriate node may be chosen based on logical and/or physical proximity to the selected node that the pinned component is pinned to and such choice may be based on one or more weights and/or constraints associated with the connection between the pinned component and the neighbor component.

The placer may continue looking for more unplaced components 1110 until at least a sufficient number of the components have been placed. In some embodiments, the placer may attempt to place all components, or may attempt to place more than a computer system-defined percentage of the components, or may attempt to place the most critical components as measured by one or more computer system-defined criteria or may attempt to satisfy some other such computer system-defined metric of sufficient placement. Once a sufficient number of components have been placed, the placer may then generate a score for the placement 1114, evaluating the placement in terms of one or more factors. The factors used by the placer to evaluate the placement may include, but not be limited to, resource availability, connection bandwidth, connection latency, resource overloading, satisfaction of placement constraints, conformity to placement weights and/or other such placement factors.

If the placement is an improvement 1118, the placer may retain the placement 1120 by, for example, preserving one or more of the weights, preserving one or more of the placement decisions, preserving one or more decisions regarding connection constraints and/or other such placement retention methods. The placer may also evaluate the placement in terms of whether it is an acceptable solution 1124 from which to present a solution 1128 of one or more placement commands that may be sent to one or more processes configured to instantiate components on computer systems within the computer system network. The placer may determine that the placement is an acceptable solution based on, for example, the score generated for the placement being above a computer system-defined threshold, or due to a certain number of iterations having passed or due to a combination of these and/or other such criteria.

If the placement is not an improvement 1118, or if the placement is not an acceptable solution 1124, the placer may discard the placement 1122 and then may determine whether the solution is taking too long by, for example, exceeding a computer system-defined timeout 1126. In the event that the solution has taken too long, the placer may elect to mitigate by performing one or more operations to simplify the solution, or may elect to present a partially correct and/or suboptimal solution or some other such mitigation operations. If the process has not experienced a timeout 1126, the placer may continue searching for a solution by, in some embodiments, adjusting one or more random values 1116, clearing one or more of the placements made in the previous iteration 1112 and then iterate the process, searching for a better solution. In some embodiments, the placer may select a different component for pinning 1132 or the placer may use the same pinned components but may select the neighbors in a different order.

Figure 12:
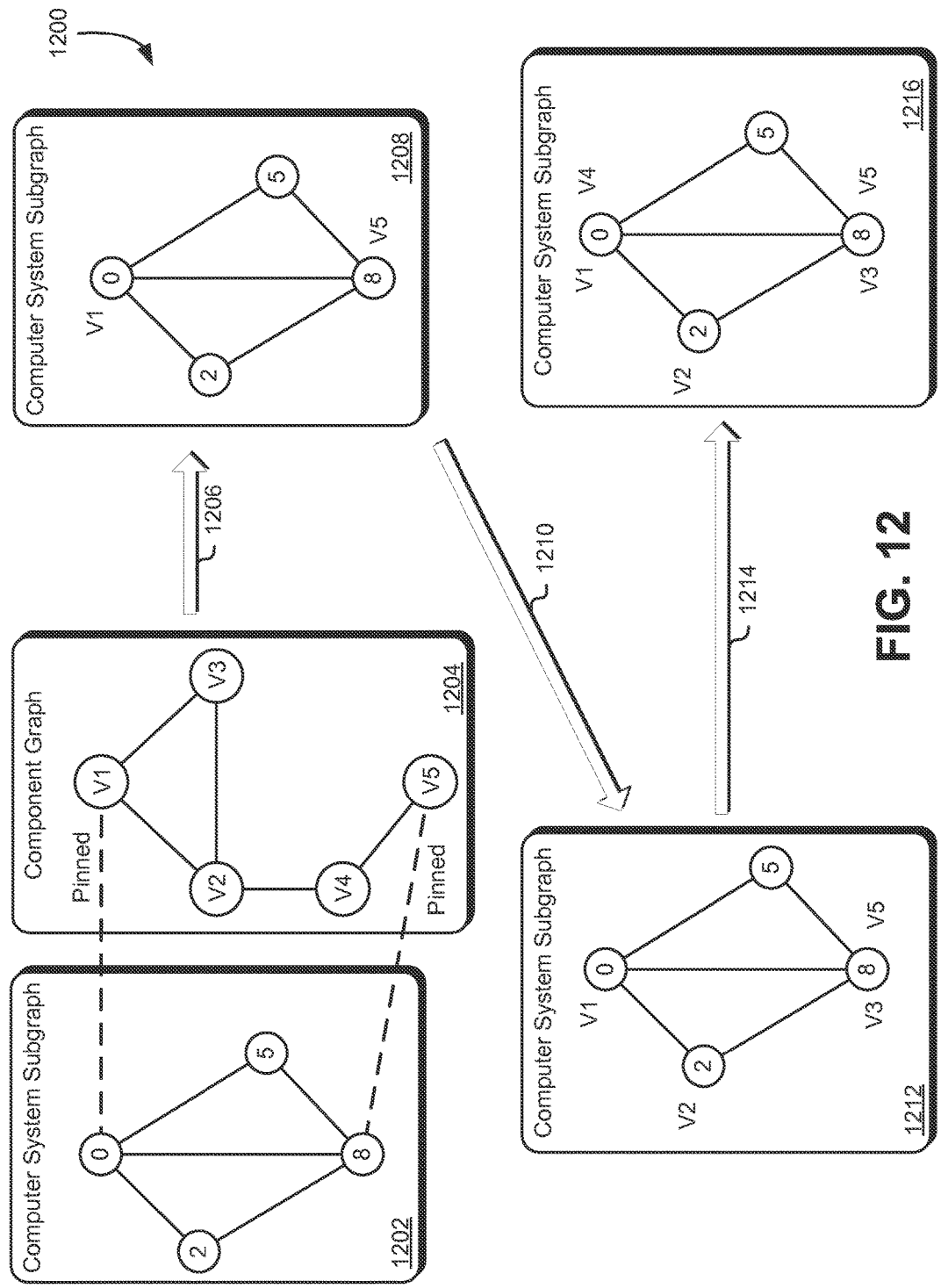
FIG. 12 shows an illustrative example of an environment where multiple components may be pinned in a placement solution in accordance with at least one embodiment.

FIG. 12 illustrates an example environment 1200 for pinning multiple components to network locations as described herein at least in connection with FIG. 10 and in accordance with at least one embodiment. A computer system subgraph 1202 containing a reduced subset of candidate placement nodes as described herein at least in connection with FIGS. 3 and 9 may have one or more components within a component graph 1204 as described herein at least in connection with FIG. 3, placed within the computer system subgraph 1202. The one or more components may be pinned to one or more nodes within the computer system subgraph 1202, thus at least partially constraining the solution. In the example illustrated in FIG. 12, a component represented by node V in the component graph 1204 is pinned to the location represented by node 0 in computer system subgraph 1202 and a component represented by node V5 in the component graph 1204 is pinned to the location represented by node 8 in the computer system subgraph 1202. As a result of these pinning operations, represented by placement 1206, node V1 has been placed at the network location represented by node 0 in computer system subgraph 1208 and node V5 has been placed at the network location represented by node 8 in computer system subgraph 1208.

Next, the neighbor components of the component represented by node V1 may be placed in the computer system subgraph. The placement 1210 places the component represented by node V2 in the component graph 1204 (the first neighbor of node V1) in the location represented by node 2 in computer system subgraph 1208 and places the component represented by node V3 in the component graph 1204 (the second neighbor of node V1) in the location represented by node 8 in computer system subgraph 1208, resulting in computer system subgraph 1212. Finally, placement 1214 places the component represented by node V4 in the component graph 1204 (the neighbor of node V5) in the location represented by node 0 in computer system subgraph 1212, resulting in computer system subgraph 1216. The component represented by node V4 in the component graph 1204 might not be placed in the location represented by node 5 in the computer system subgraph 1212 because there would be no connection between V2 and V4. The solution represented in computer system subgraph 1216 may be a good solution based on it being a set of legal placements that satisfy all constraints. The solution represented in computer system subgraph 1216 may be also bad solution based on, for example, the overcrowding of the location represented by node 0 and node 8 in computer system subgraph 1216 as well as the fact that there are no placements in the location represented by node 5 in computer system subgraph 1216.

Figure 13:
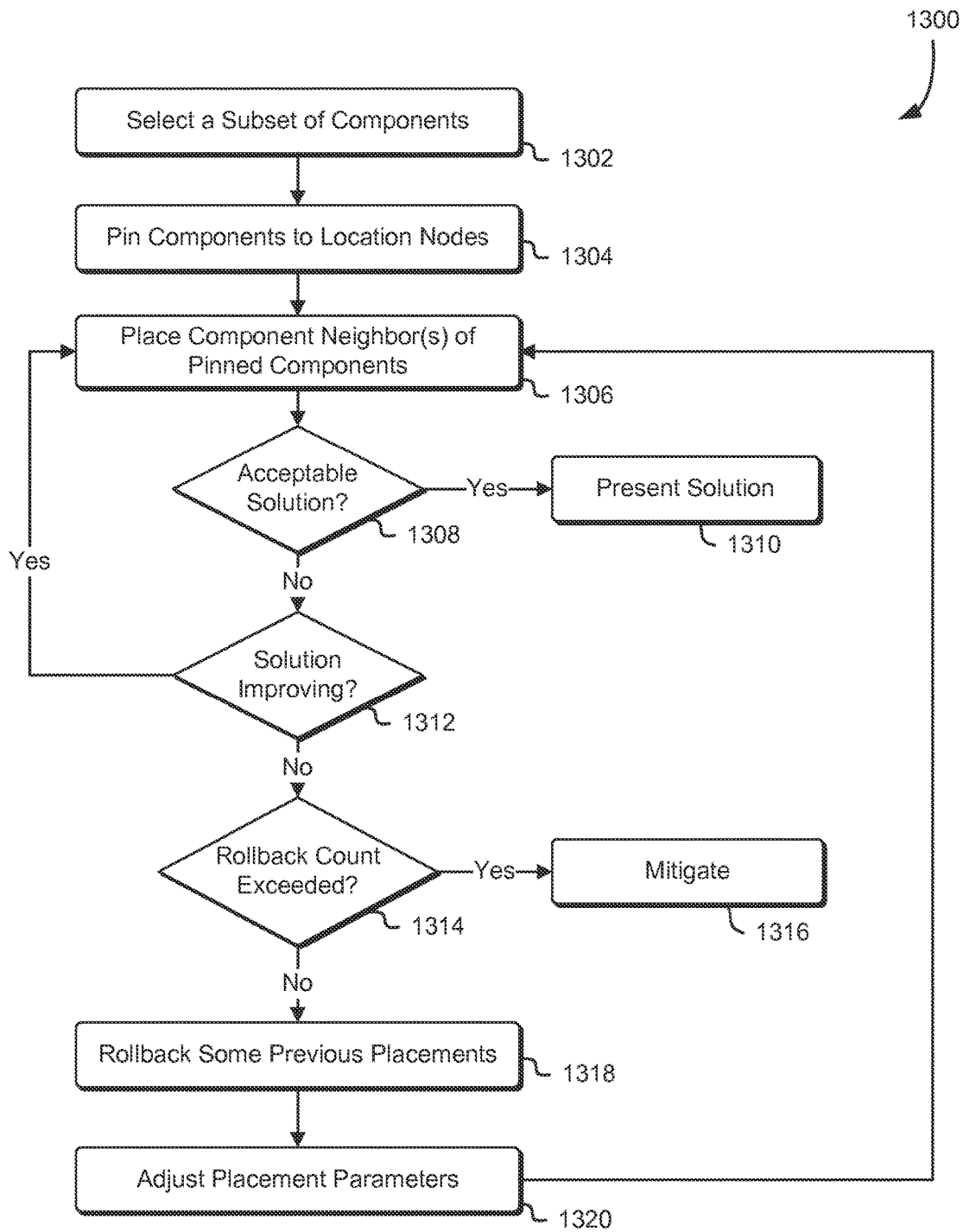
FIG. 13 shows an illustrative example of a process for iteratively optimizing the placement of components, including partial rollbacks, in accordance with at least one embodiment.

FIG. 13 shows an illustrative example of a process 1300 for iteratively optimizing the placement of one or more components utilizing a rollback within a computer system network as described herein at least in connection with FIGS. 1 and 10 and in accordance with at least one embodiment. The process 1300 may be performed by any suitable computer system, such as a computer system implementing one or more placement processes, such as described herein above. The placer may select a subset of the components 1302, may pin those components to location nodes 1304 and may then begin placing component neighbor(s) of the pinned components 1306 all as described herein at least in connection with FIG. 11 and in accordance with at least one embodiment.

The placer may then evaluate the placement in terms of whether it is an acceptable solution 1308 from which to present a solution 1310 of one or more placement commands that may be sent to one or more processes configured to instantiate components on computer systems within the computer system network. The placer may determine that the placement is an acceptable solution based on, for example, the score generated for the placement being above a computer system-defined threshold, or due to a certain number of iterations having passed or due to a combination of these and/or other such criteria. If the solution is not an acceptable solution 1308, the placer may then determine whether the solution is at least improving 1312 and/or approaching an acceptable solution using, for example, the score mentioned herein. If the solution is at least improving 1312, the placer may continue making placements in search of an acceptable solution. If it is not the case that the solution is at least improving 1312, the placer may begin a rollback process by determining whether a computer system-defined rollback has been exceeded 1314 and, if not, may rollback some of the previous placements 1318, may adjust one or more placement parameters 1320 as described herein at least in connection with FIG. 11 and may then return to placing component neighbor(s) of the pinned components 1306.

Figure 14:
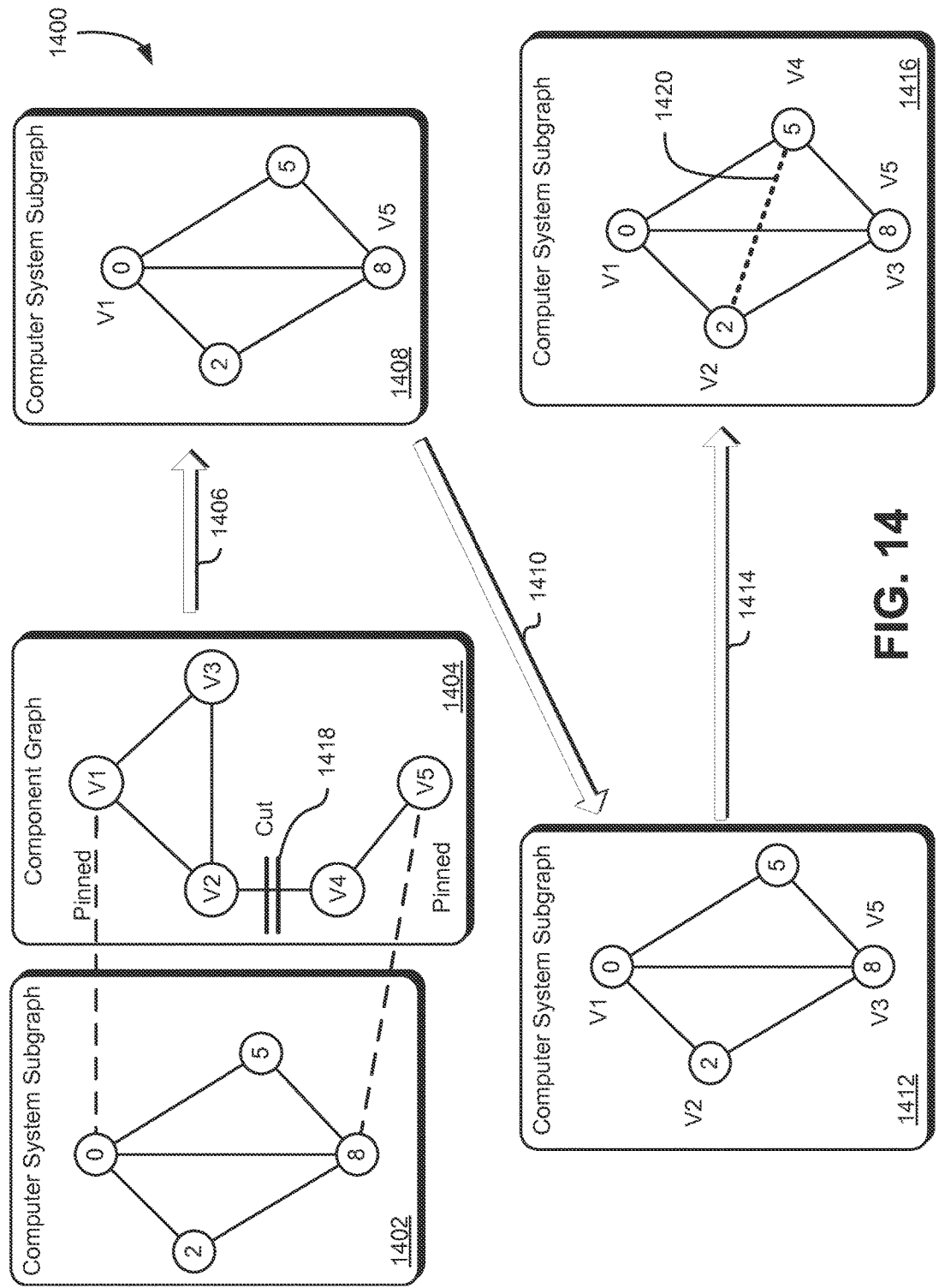
FIG. 14 shows an example environment in which a graph of candidate component placements is subdivided in accordance with at least one embodiment.

FIG. 14 illustrates an example environment 1400 for simplifying a solution for placing components in network locations as described herein at least in connection with FIG. 10 and in accordance with at least one embodiment by subdividing the component graph into subgraphs. A computer system subgraph 1402 containing a reduced subset of candidate placement nodes as described herein at least in connection with FIGS. 3 and 9 may have one or more components within a component graph 1404 as described herein at least in connection with FIG. 3, placed within the computer system subgraph 1402. The component graph may have been simplified by dividing the component graph into two subgraphs by the cut 1418 between the component represented by node V2 in component graph 1404 and the component represented by node V4 in component graph 1404. In each subgraph solution, one or more components may be pinned to one or more nodes within the computer system subgraph 1402, thus at least partially constraining the solution. In the example illustrated in FIG. 14, a component represented by node V1 in the first subgraph of component graph 1404 is pinned to the location represented by node 0 in computer system subgraph 1402 and a component represented by node V5 in the second subgraph of component graph 1404 is pinned to the location represented by node 8 in the computer system subgraph 1402. As a result of these pinning operations, represented by placement 1406, node V1 has been placed at the network location represented by node 0 in computer system subgraph 1408 and node V5 has been placed at the network location represented by node 8 in computer system subgraph 1408.

Next, the neighbor components of the component represented by node V1 may be placed in the computer system subgraph. The placement 1410 places the component represented by node V2 in the component graph 1404 (the first neighbor of node V1) in the location represented by node 2 in computer system subgraph 1408 and places the component represented by node V3 in the component graph 1404 (the second neighbor of node V1) in the location represented by node 8 in computer system subgraph 1408, resulting in computer system subgraph 1412. Next, placement 1414 places the component represented by node V4 in the component graph 1404 (the neighbor of node V5) in the location represented by node 5 in computer system subgraph 1412. In contrast to the example presented in FIG. 12, the component represented by node V4 may be placed in the location represented by node 5 because the constraint on the connection between node V4 and node V2 has been removed due to the cut 1418 between these nodes that was used to divide the component graph into two subgraphs. Reassembling the graph may then require the creation 1420 of an edge between the location represented by node 2 in computer system subgraph 1412 and the location represented by node 5 in computer system subgraph 1412, resulting in computer system subgraph 1416. The solution represented in computer system subgraph 1416 may be a good solution based on it being a set of legal placements that satisfy all constraints. The solution represented in computer system subgraph 1416 may be also bad solution based on, for example, the overcrowding of the location represented by node 8 in computer system subgraph 1416 as well as the fact that a connection needed to be created between node 2 and node 5 in computer system subgraph 1416.

Figure 15:
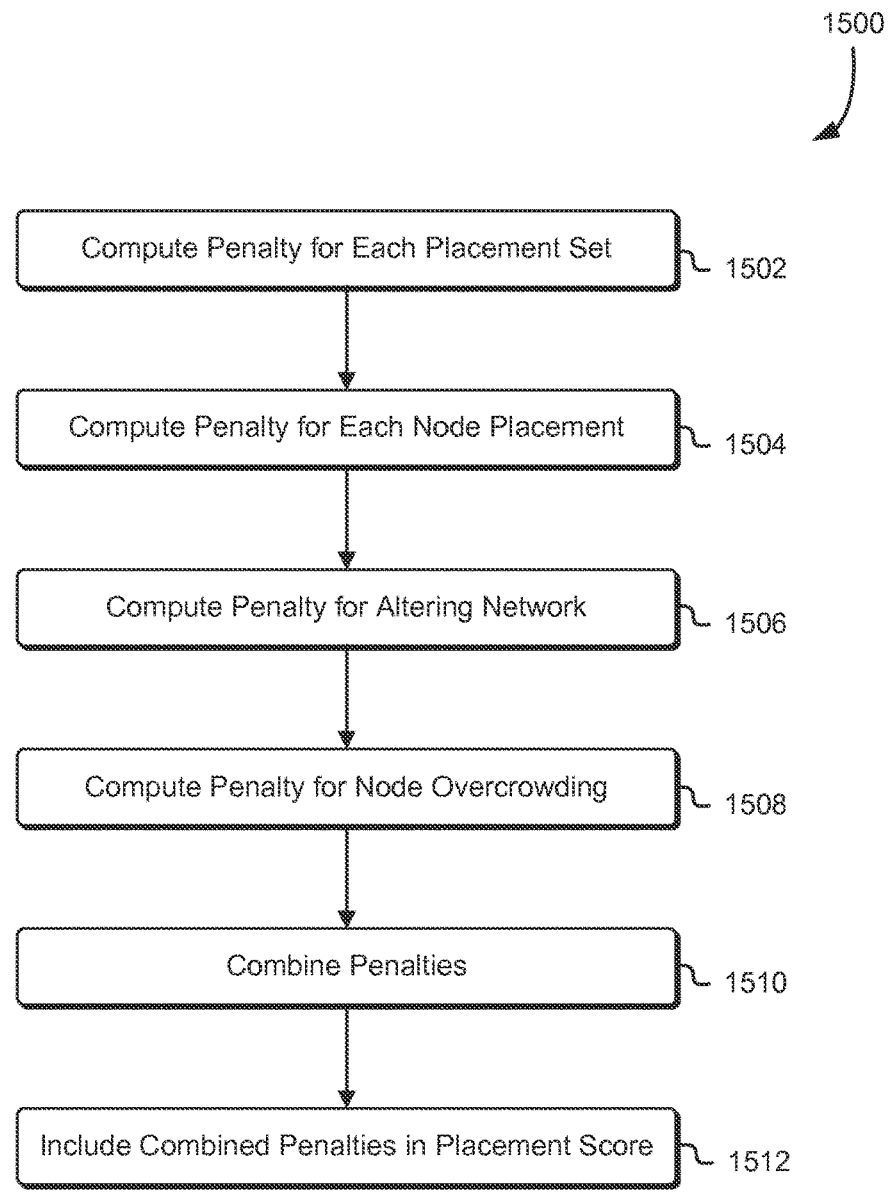
FIG. 15 shows an illustrative example of a process for computing penalty scores associated with iteratively optimizing component placement in accordance with at least one embodiment.

FIG. 15 shows an illustrative example of a process 1500 for computing penalty scores associated with iteratively optimizing the placement of one or more components within a computer system network as described herein at least in connection with FIGS. 1 and 10 and in accordance with at least one embodiment. The process 1500 may be performed by any suitable computer system, such as a computer system implementing one or more placement processes, such as described herein above. The placer may first compute a penalty associated with each placement set 1502, where such penalties may include violation of constraints between components, overutilization of resources, network latency, network bandwidth, economic costs, business value and/or other such penalties. The placer may also compute a penalty associated with each node placement 1504, where such penalties may include penalties such as the penalties associated with the set placement and/or may include other such penalties. In some embodiments, where the network may require alterations to establish lost communications, or as a result of subdividing the component subgraph or as a result of other such connectivity changes, the placer may compute a penalty associated with altering the network 1506. The placer may compute a penalty associated with overcrowding a node location 1508 and/or with underutilizing a node location. The placer may then combine the penalties 1510 and include the combined penalties in the placement score 1512 that may be used to evaluate and/or optimize the solution. As may be contemplated, the penalties mentioned herein are illustrative examples and other such penalties may be included in the computation and may also be considered as within the scope of the present disclosure.

In addition to the foregoing, the above examples are explained in connection with the placement and instantiation of virtual computer systems in a network of computing devices. The techniques described herein and variations thereof are applicable to other contexts and, generally, applicable to placement decisions involving computing resources in a network. As one example, the techniques described herein may be used to assign programming modules (e.g., applications) to computing devices in a network so that the applications (e.g., applications for implementing servers) are placed in the network in accordance with connectivity requirements. As another example, the techniques described herein may be used to assign partitions of a data set and/or different drives to networked storage devices in a network that contains a plurality of data storage devices. Other allocations of computing resources to devices in a network may also be made using the techniques described herein.

Figure 16:
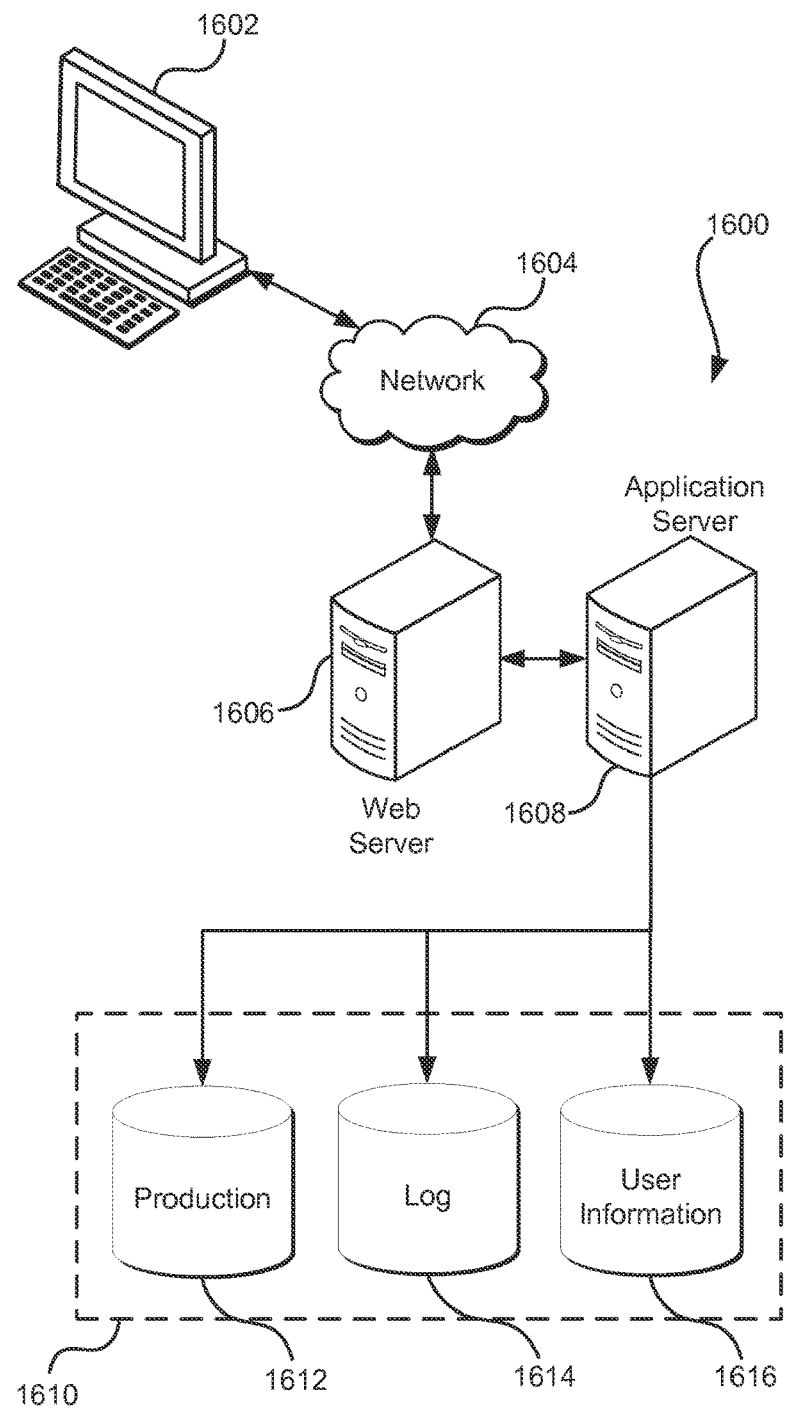
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1602 and the application server 1608, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer implemented method, comprising:
    obtaining a representation of a graph based at least in part on a network that includes a plurality of computing devices, the graph comprising:
        a plurality of vertices, each vertex of the plurality of vertices associated with a computing device of the plurality of computing devices, and
        a plurality of edges, each edge of the plurality of edges having a weight associated with a characteristic of a connection between respective devices of the plurality of computing devices;
    generating, based at least in part on a set of connectivity requirements associated with a set of virtual machines and weights associated with the plurality of edges, a second representation that comprises a second plurality of edges having fewer members than the plurality of edges;
    generating, based at least in part on the second representation, the set of connectivity requirements, and a second set of weights associated with the second representation, a placement decision that includes an assignment of each virtual machine in the set of virtual machines to a device of the plurality of computing devices; and
    causing instantiation of the set of virtual machines using respective devices of the plurality of computing devices in accordance with the placement decision.

2. The computer implemented method of claim 1, wherein the representation of the graph is based at least in part on a Laplacian matrix of the graph.

3. The computer implemented method of claim 1, wherein processing the representation of the graph comprises probabilistically removing edges from the graph.

4. The computer implemented method of claim 3, wherein probabilistically removing edges from the graph is performed in accordance with a set of edges specified for exclusion from deletion from the graph.

5. The computer implemented method of claim 1, wherein:
    processing the representation of the graph comprises:
        determining a subgraph of a spanning tree of the graph; and
        probabilistically adding edges back to the subgraph; and
    processing the representation of the graph is based at least in part on the subgraph with the probabilistically added edges.

6. The computer implemented method of claim 5, wherein:
    probabilistically adding edges back to the subgraph comprises probabilistically selecting edges from a set of edges, each edge of at least a subset of the edges corresponding to a bandwidth; and
    probabilistically selecting the edges from the set of edges is based at least in part on a probability distribution that, at least in part, increases as a function of bandwidth.

7. A system, comprising:
    one or more processors; and
    memory with instructions that, if executed by the one or more processors, cause the system to:
        obtain a first representation of a network comprising a plurality of computing devices, the representation of connections between devices in the network indicating:
            a plurality of vertices, each vertex of the plurality of vertices associated with a respective computing device of the plurality of computing devices, and
            a plurality of edges, each edge of the plurality of edges having a respective weight associated with a characteristic of a connection between respective devices of the plurality of computing devices:
        generate, based at least in part on weights associated with the plurality of edges and the first representation, a second representation of the network that indicates fewer network connections than the first representation;
        generate, based at least in part on network connectivity requirements of a set of computing resources, the second representation, and a second set of weights associated with the second representation, a placement decision that indicates an assignment of a member of the set of computing resources with other respective members of the plurality of computing devices; and
        cause the instantiation of the plurality of computing resources based at least in part on the placement decision.

8. The system of claim 7, wherein:
    the first representation of the network is a matrix of a graph of the network; and
    the second representation of the network is generated by transforming the matrix to be more sparse than the first representation.

9. The system of claim 8, wherein the matrix is based at least in part on a Laplacian of the graph of the network.

10. The system of claim 7, wherein:
    the first representation of the network is based at least in part on a graph of the network; and the second representation of the network is generated based at least in part on a subgraph of a spanning tree of the graph.

11. The system of claim 7, wherein the placement decision is generated by performing an iterative method of solving a system of linear equations, the system of linear equations based at least in part on the second representation.

12. The system of claim 11, wherein the iterative method of solving the system of linear equations solves the system of linear equations by approximating a solution to within a threshold value based at least in part on the network connectivity requirements.

13. The system of claim 7, wherein the second representation of the network is generated based at least in part on one or more probabilistic modifications of a subgraph of a graph of the network.

14. The system of claim 13, wherein the one or more probabilistic modifications of the subgraph include:
    probabilistic deletions of edges from the graph;
    determination of the subgraph after performing the probabilistic deletions; and
    probabilistic additions of deleted edges to the subgraph.

15. The system of claim 14, wherein one or more edges of the graph have one or more weights associated with the edges of the graph, the one or more weights based at least in part on an inverse of one or more probabilities associated with the probabilistic modification of the subgraph of the graph of the network.

16. The system of claim 14, wherein probabilistic additions of deleted edges to the subgraph includes probabilistic additions of the deleted edges with replacement.

17. The system of claim 16, wherein one or more edges of the graph have one or more weights associated with the probabilistic additions of the deleted edges with replacement, the one or more weights based at least in part on a number of selections of the deleted edges.

18. A non-transitory computer readable storage medium having collectively stored thereon executable instructions that, if executed by one or more processors of a computer system, cause the computer system to at least:
    obtain a representation of a network associated with a plurality of computing devices, the network comprising:
        a plurality of vertices, each vertex of the plurality of vertices associated with a respective computing device of the plurality of computing devices, and
        a plurality of edges, each edge of the plurality of edges having a respective weight associated with a characteristic of a connection between respective devices of the plurality of computing devices:
    generate a simplified representation of the network based at least in part on a probabilistic selection of a subset of a plurality of network connections between respective computing devices in the network and respective weights associated with the plurality of edges, the subset having fewer members than the connections of the network;
    use the simplified representation of the network and the weights determine a placement indicating an assignment of each of a plurality of computing resources to a device among a subset of the one or more computing devices; and
    cause provisioning of the plurality of computing resources according to the placement.

19. The non-transitory computer readable storage medium of claim 18, wherein the instructions that cause the computer system to determine the placement further cause the computer system to solve a system of linear equations, the system of linear equations based at least in part on the simplified representation and a set of requirements for the placement.

20. The non-transitory computer readable storage medium of claim 18, wherein the simplified representation is based at least in part on a subgraph of a graph of the network.

21. The non-transitory computer readable storage medium of claim 20, wherein the instructions that cause the computer system to generate the simplified representation of the network further cause the computer system to generate the simplified representation by probabilistically adding edges to a subgraph of a spanning tree of the graph.

22. The non-transitory computer readable storage medium of claim 21, wherein probabilistically adding edges to the subgraph of the spanning tree is based at least in part on probabilities correlating to bandwidth values assigned to edges in the graph.

23. The non-transitory computer readable storage medium of claim 22, wherein the edges in the graph have weights assigned, such weights based at least in part on an inverse of the probabilities correlating to the bandwidth values assigned to the edges in the graph.

24. The non-transitory computer readable storage medium of claim 18, wherein the instructions, if executed by the one or more processors, further cause the computer system to:
    generate a plurality of simplified representations of the network;
    calculate a score for each generated simplified representation of the network of the plurality of simplified representations of the network; and
    select the simplified representation based at least in part on a corresponding calculated score for the simplified representation.

25. The non-transitory computer readable storage medium of claim 24, wherein the instructions that cause the computer system to calculate the score further cause the computer system to calculate the score based at least in part on a measurement of sparsity and a measurement of fidelity to the network.

* * * * *